United States Patent
Narita et al.

(10) Patent No.: US 8,337,991 B2
(45) Date of Patent: *Dec. 25, 2012

(54) MOLDINGS COMPRISING A POLYLACTIC ACID COMPOSITION

(75) Inventors: Junichi Narita, Ibaraki (JP); Hiroyuki Wakai, Ibaraki (JP)

(73) Assignee: Tohcello Co., Ltd., Tokyo (JP)

( * ) Notice: Subject to any disclaimer, the term of this patent is extended or adjusted under 35 U.S.C. 154(b) by 810 days.

This patent is subject to a terminal disclaimer.

(21) Appl. No.: 12/302,699

(22) PCT Filed: May 31, 2007

(86) PCT No.: PCT/JP2007/061501
§ 371 (c)(1),
(2), (4) Date: Apr. 10, 2009

(87) PCT Pub. No.: WO2007/139236
PCT Pub. Date: Dec. 6, 2007

(65) Prior Publication Data
US 2009/0246544 A1    Oct. 1, 2009

(30) Foreign Application Priority Data

Jun. 1, 2006    (JP) ................... 2006-154064

(51) Int. Cl.
B32B 27/06 (2006.01)
B32B 27/16 (2006.01)
B32B 27/20 (2006.01)
B32B 27/30 (2006.01)
B32B 27/36 (2006.01)

(52) U.S. Cl. ........ 428/483; 428/446; 428/457; 428/458; 428/480; 428/522; 428/325; 528/354; 528/359; 528/361; 525/411; 525/415; 525/418; 525/450

(58) Field of Classification Search .................. None
See application file for complete search history.

(56) References Cited

U.S. PATENT DOCUMENTS

| | | | | |
|---|---|---|---|---|
| 6,429,280 B1 * | 8/2002 | Hiraoka et al. | ............... | 528/354 |
| 7,175,917 B2 * | 2/2007 | Sukigara et al. | ............... | 428/480 |
| 7,390,558 B2 * | 6/2008 | Aritake et al. | ............... | 428/212 |

(Continued)

FOREIGN PATENT DOCUMENTS

EP    1 477 526    * 11/2004

(Continued)

OTHER PUBLICATIONS

International Search Report of PCT/JP2007/061501, Mailing Date of Aug. 28, 2007.

*Primary Examiner* — Vivian Chen
(74) *Attorney, Agent, or Firm* — Westerman, Hattori, Daniels & Adrian, LLP

(57) ABSTRACT

An object of the present invention is to provide a polylactic acid composition having specific thermal characteristics and gas barrier properties, and to obtain a molding comprising a polylactic acid composition of PLLA and PDLA capable of forming a polylactic acid stretched film or other molding having superior surface smoothness, transparency, heat resistance and toughness, and the constitution thereof is characterized by being a molding comprising a polylactic acid composition in which the peak in DSC measurement during cooling (at a rate of 10° C./min) after allowing to remain at 250° C. for 10 minutes is 30 mJ/mg or more, and preferably comprising a polylactic acid composition such that, in measurement during the DSC 2nd heating (cooling at a rate of 10° C./min after allowing to remain at 250° C. for 10 minutes followed by reheating from 0° C. at a rate of 10° C./min), the peak ratio (peak 1/peak 2) of the peak when Tm is 150 to 180° C. (peak 1) to the peak when Tm is 200 to 240° C. (peak 2) is 0.5 or less; and a molding comprising a composition in which an inorganic filler is incorporated in the composition described above.

16 Claims, 10 Drawing Sheets

U.S. PATENT DOCUMENTS

| | | | |
|---|---|---|---|
| 7,727,606 B2 * | 6/2010 | Takase et al. | 428/36.5 |
| 7,854,880 B2 * | 12/2010 | Nishimura et al. | 264/544 |
| 7,863,343 B2 * | 1/2011 | Haraguchi et al. | 521/60 |
| 7,993,745 B2 * | 8/2011 | Narita et al. | 428/339 |
| 2005/0001358 A1 * | 1/2005 | Nakazawa et al. | 264/331.18 |
| 2009/0035585 A1 * | 2/2009 | Wakaki et al. | 428/446 |

FOREIGN PATENT DOCUMENTS

| | | | |
|---|---|---|---|
| JP | 2000-017163 | * | 1/2000 |
| JP | 2000-17163 A | | 1/2000 |
| JP | 2002-003709 | * | 1/2002 |
| JP | 2003-136592 | * | 5/2003 |
| JP | 2003-192884 A | | 7/2003 |
| JP | 2005-042084 | * | 2/2005 |
| JP | 2005-42084 A | | 2/2005 |
| JP | 2005-299067 | * | 10/2005 |
| WO | 2006/095923 A1 | | 9/2006 |

* cited by examiner

MOLDINGS COMPRISING A POLYLACTIC ACID COMPOSITION

TECHNICAL FIELD

The present invention relates to moldings which comprise a polylactic acid composition having specific thermal characteristics and which are molded by injection, blow molding, vacuum/air pressure molding or extrusion. Moreover, the present invention relates to a composition comprising poly-L-lactic acid and poly-D-lactic acid, and to moldings which comprise that composition, are molded by injection, blow molding, vacuum/air pressure molding or extrusion molding, and have superior heat resistance, gas barrier properties, toughness and surface smoothness.

BACKGROUND

Highly universal aliphatic polyesters are attracting attention as a biodegradable plastic, and aliphatic polyesters such as polylactic acid (PLA), polybutylene succinate (PBS), polyethylene succinate (PES) and polycaprolactone (PCL) are available commercially.

Application fields of these biodegradable aliphatic polyesters include film fields such as packaging, agricultural and food films, and films used in these fields are required to have basic performance in terms of high strength, heat resistance, gas barrier properties and biodegradability corresponding to the application thereof.

Among these aliphatic polyesters, PLA is comprised of poly-L-lactic acid (PLLA) and poly-D-lactic acid (PDLA), and since the melting point of single crystals thereof (a crystals) is about 170° C., there are cases in which PLA has inadequate heat resistance as compared with, for example, polyethylene terephthalate, thus requiring improvement thereof.

On the other hand, numerous methods have been proposed for further improving the heat resistance of PLA by blending poly-L-lactic acid (PLLA) and poly-D-lactic acid (PDLA) followed by forming a stereocomplex thereof (for example, Patent Document 3, Patent Document 4, Non-Patent Document 1).

This stereocomplex (SC) is a eutectic mixture of poly-L-lactic acid (PLLA) and poly-D-lactic acid (PDLA), and since the melting point of crystals thereof is about 50° C. higher than α crystals, there are considerable expectations for its use.

However, a stereocomplex is not easily formed simply by melting and mixing PLLA and PDLA and molding the resulting composition into a film, and although the formed film has improved heat resistance, it is difficult to use as a packaging film.

Therefore, the inventors proposed that PLLA and PDLA be melted and mixed, and that the resulting composition be stretched in at least the axial direction under specific conditions to obtain a stretched film having superior heat resistance and toughness (Japanese Patent Application No. 2004-146239).

This stretched film has a diffraction peak (2θ) as determined by wide-angle X-ray diffraction in the vicinity of 16° (the peak detected in this region may also be referred to as ($P_{PL}$)), and the total area ($S_{SC}$) of diffraction peaks (2θ) in the vicinity of 12° C., in the vicinity of 21° and in the vicinity of 24° (peaks detected in this region may be collectively referred to as ($P_{SC}$)) is less than 10% of the total amount of the area ($S_{PL}$) of a diffraction peak ($P_{PL}$) in the vicinity of 16° and ($S_{SC}$).

Consequently, SC crystals in stretched films are rare as compared with crystals of PLLA and PDLA alone.

Moreover, the present inventors proposed a method for producing a stretched film comprised mainly of SC crystals in which the main diffraction peaks (2θ) as determined by wide-angle X-ray diffraction are in the vicinity of 12°, in the vicinity of 21° and in the vicinity of 24° by carrying out a specific heat treatment on the stretched film (Japanese Patent Application No. 2004-146240).

In addition, a method for improving the gas barrier properties of a polylactic acid-based biaxially stretched film has been proposed comprising the providing of an inorganic oxide, inorganic nitride or inorganic oxide-nitride (Patent Document 5).

[Patent Document 1] Japanese Patent Application Laid-open No. H7-207041
[Patent Document 2] Japanese Patent Application Laid-open No. H8-198955
[Patent Document 3] Japanese Patent Application Laid-open No. H9-25400
[Patent Document 4] Japanese Patent Application Laid-open No. 2000-17164
[Patent Document 5] Japanese Patent Application Laid-open No. H10-24518
[Non-Patent Document 1] Macromolecules, 20, 904 (1987)

DISCLOSURE OF THE INVENTION

The present invention relates to moldings comprised of a polylactic acid composition having specific thermal characteristics, and an object thereof is to provide moldings molded by injection, blow molding, vacuum/air pressure molding or extrusion having superior surface smoothness, transparency, heat resistance, barrier performance and toughness.

As a result of conducting extensive studies to achieve the above object, the present inventors found that by melting and mixing poly-L-lactic acid (PLLA) and PDLA under specific conditions, the resulting polylactic acid composition enables a stereocomplex structure to be easily and selectively formed during the course of crystallization, and that an injection, blow-molded, vacuum/air pressure-molded or extrusion-molded molding comprised of that composition has superior surface smoothness, transparency, heat resistance, gas barrier performance and toughness, thereby leading to completion of the present invention.

Namely, the present invention relates to a molding, molded by injection, blow molding, vacuum/air pressure molding or extrusion, and comprising a polylactic acid composition in which the peak in DSC measurement during cooling (at a rate of 10° C./min) after allowing to remain at 250° C. for 10 minutes is 30 mJ/mg, preferably 45 mJ/mg or more and particularly preferably 50 mJ/mg or more.

Moreover, the composition used in a preferable molding of the present invention is such that, in measurement during the DSC 2nd heating (cooling at a rate of 10° C./min after allowing to remain at 250° C. for 10 minutes followed by reheating from 0° C. at a rate of 10° C./min), the peak ratio (peak 1/peak 2) of the peak when Tm is 150 to 180° C. (peak 1) to the peak when Tm is 200 to 240° C. (peak 2) is 0.5 or less, preferably 0.3 or less and more preferably 0.2 or less.

In addition, the composition used in moldings of the present invention is a polylactic acid composition in which the peak when Tm is 200 to 240° C. (peak 2) is 35 mJ/mg or mare in measurement during the DSC 2nd heating (cooling at a rate of 10° C./min after allowing to remain at 250° C. for 10 minutes followed by reheating from 0° C. at a rate of 10° C./min).

The polylactic acid composition used in these moldings is preferably comprised of, and namely prepared from, 25 to 75 parts by weight, preferably 35 to 65 parts by weight and particularly preferably 45 to 55 parts by weight of poly-L-lactic acid, and 75 to 25 parts by weight, preferably 65 to 35 parts by weight and particularly preferably 55 to 45 parts by weight of poly-D-lactic acid (based on 100 parts by weight of the total of poly-L-lactic acid and poly-D-lactic acid).

Such a composition can be obtained by, for example, mixing a polylactic acid composition of 25 to 75 parts by weight, preferably 35 to 65 parts by weight and particularly preferably 45 to 55 parts by weight of poly-L-lactic acid, and 75 to 25 parts by weight, preferably 65 to 35 parts by weight and particularly preferably 55 to 45 parts by weight of poly-D-lactic acid, at 230 to 260° C., and imparting melting and mixing energy with a twin screw extruding machine. In the case of using a batch-type low-shear mixing machine in the manner of a Brabender, mixer, melting and mixing time is normally at least 10 minutes and preferably at least 15 minutes, but no longer than 60 minutes and preferably no longer than 40 minutes. In addition, in the case of using a high-shear machine such as a twin screw extruding machine, melting and mixing time is typically at least 2 minutes and particularly at least 4 minutes, but no longer than 15 minutes.

During the mixing of the present invention, the raw materials are preferably melted and mixed under conditions of adequately drying or subjecting to nitrogen sealing and the like by imparting a load so that the weight average molecular weight of the resulting composition is within the range of 0.3 to 0.6 times, and more preferably within the range of 0.4 to 0.6 times, the value of weight average molecular weight obtained by weight-averaging the respective weight average molecular weight of the poly-L-lactic acid and poly-D-lactic acid used. A composition obtained as a result thereof is in a state in which the poly-L-lactic acid and the poly-D-lactic acid are extremely finely fused.

In addition, examples of moldings comprised of these compositions include various types of moldings such as injection, blow, extrusion, vacuum and air pressure molded or spun moldings.

BRIEF DESCRIPTION OF THE DRAWINGS

FIG. 1 is a drawing showing a chart indicating the results of DSC measurement during 1st heating of a pressed sheet of Example 2a;

FIG. 2 is a drawing showing a chart indicating the results of DSC measurement during 1st cooling of a pressed sheet of Example 2a;

FIG. 3 is a drawing showing a chart indicating the results of DSC measurement during 2nd heating of a pressed sheet of Example 2a;

FIG. 4 is a drawing showing a chart indicating the results of DSC measurement during 1st heating of a stretched film of Example 2a;

Figure 1:
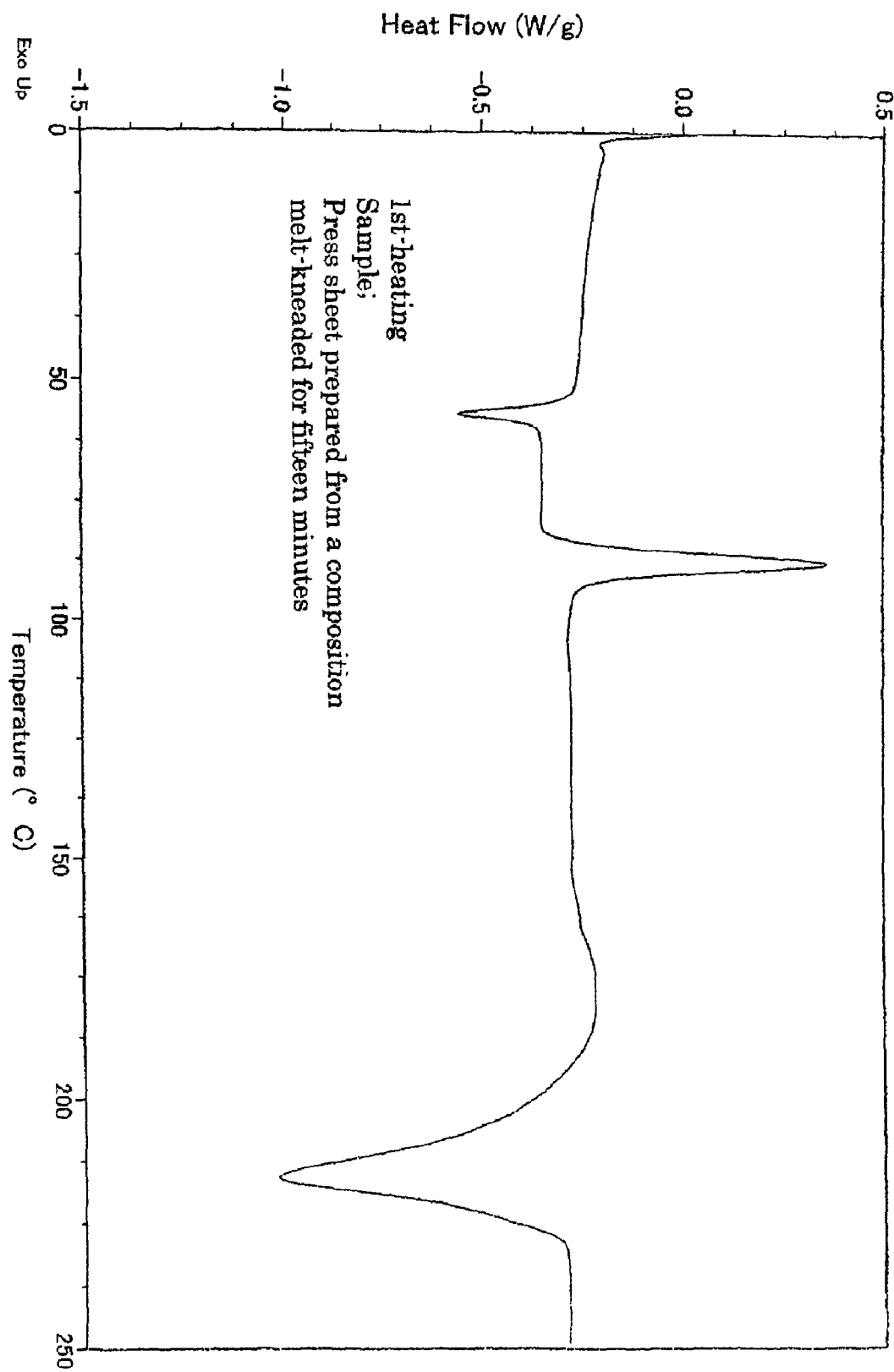
Figure 2:
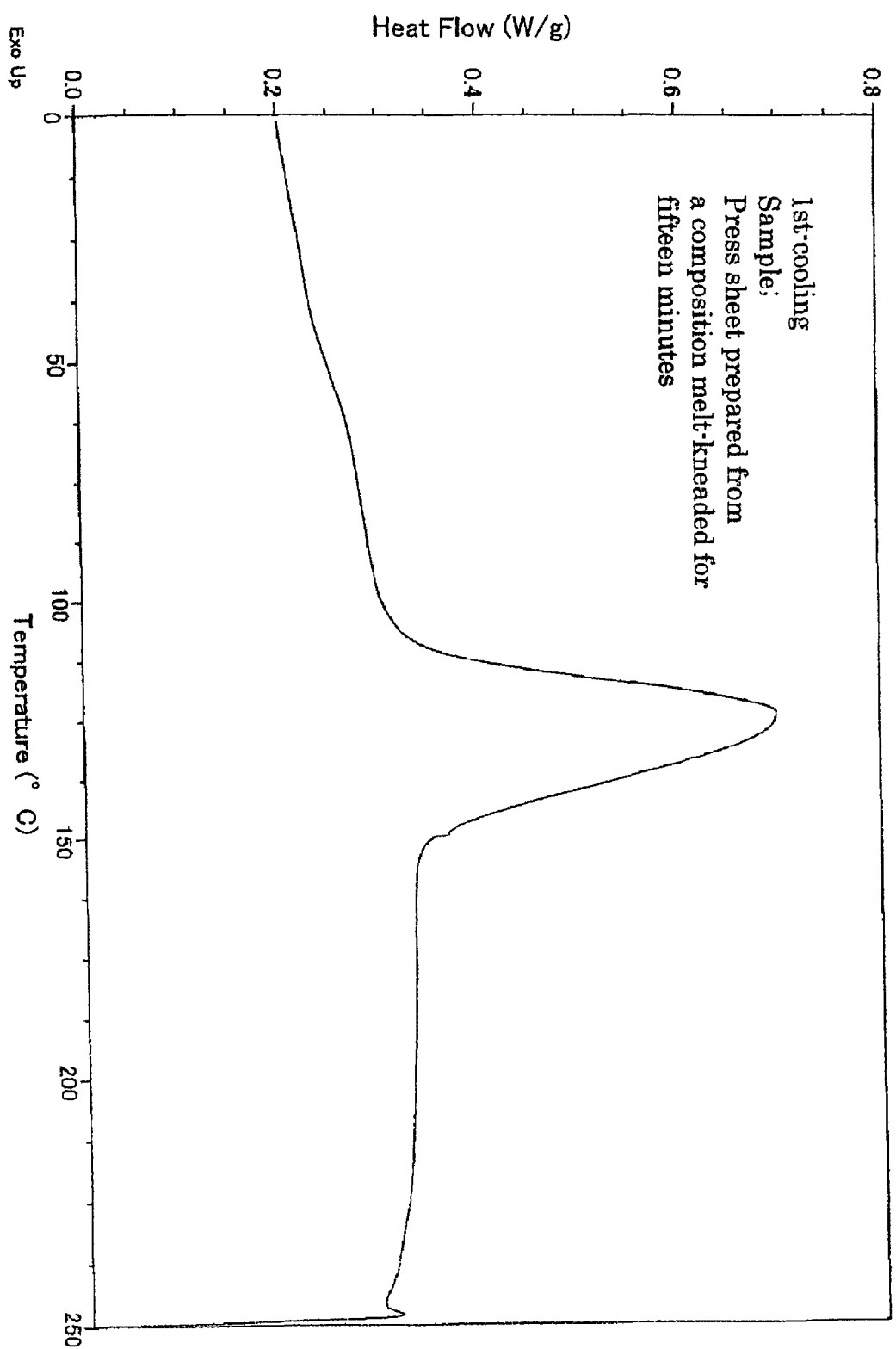
Figure 3:
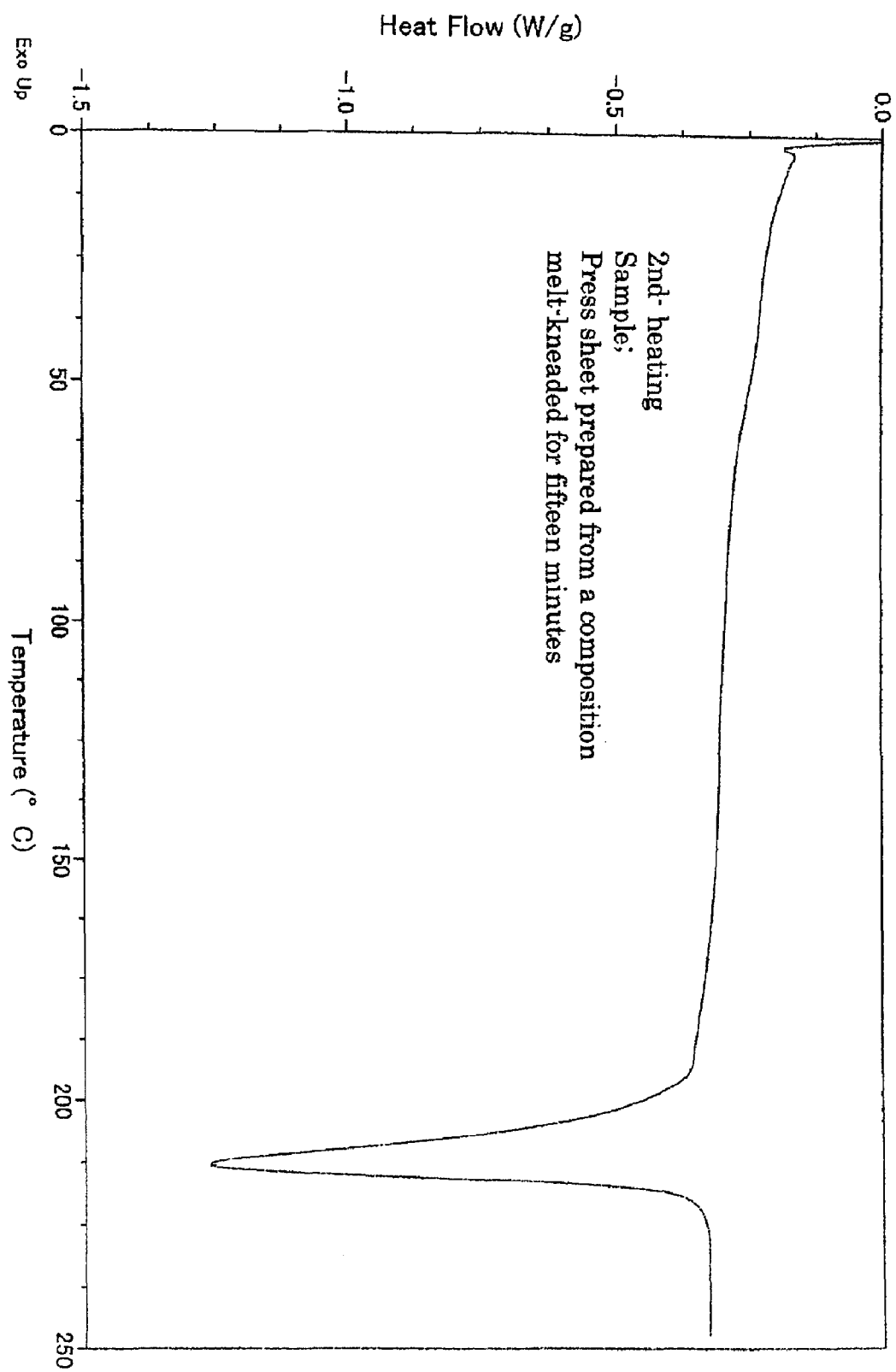
Figure 4:
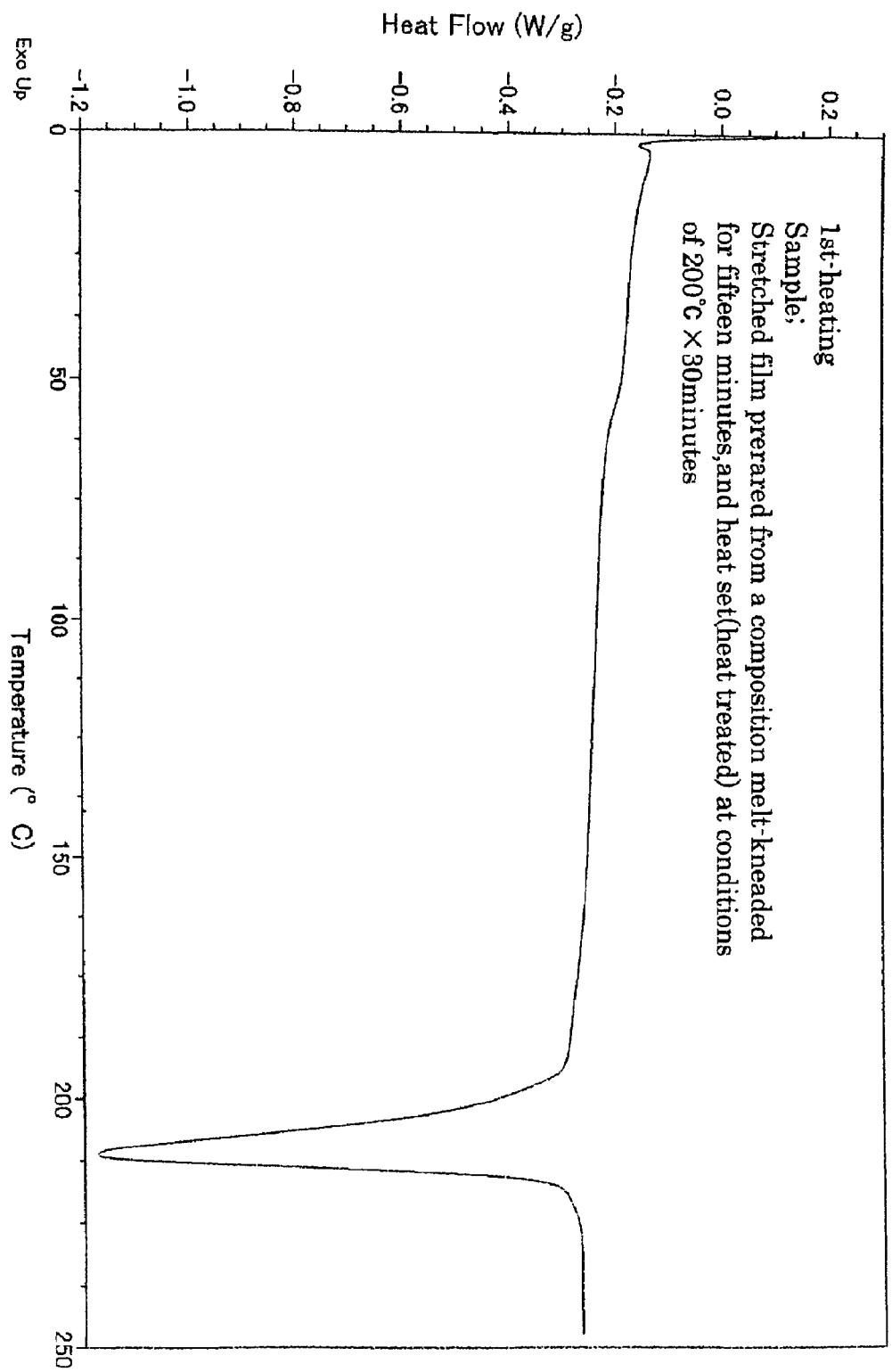
Figure 5:
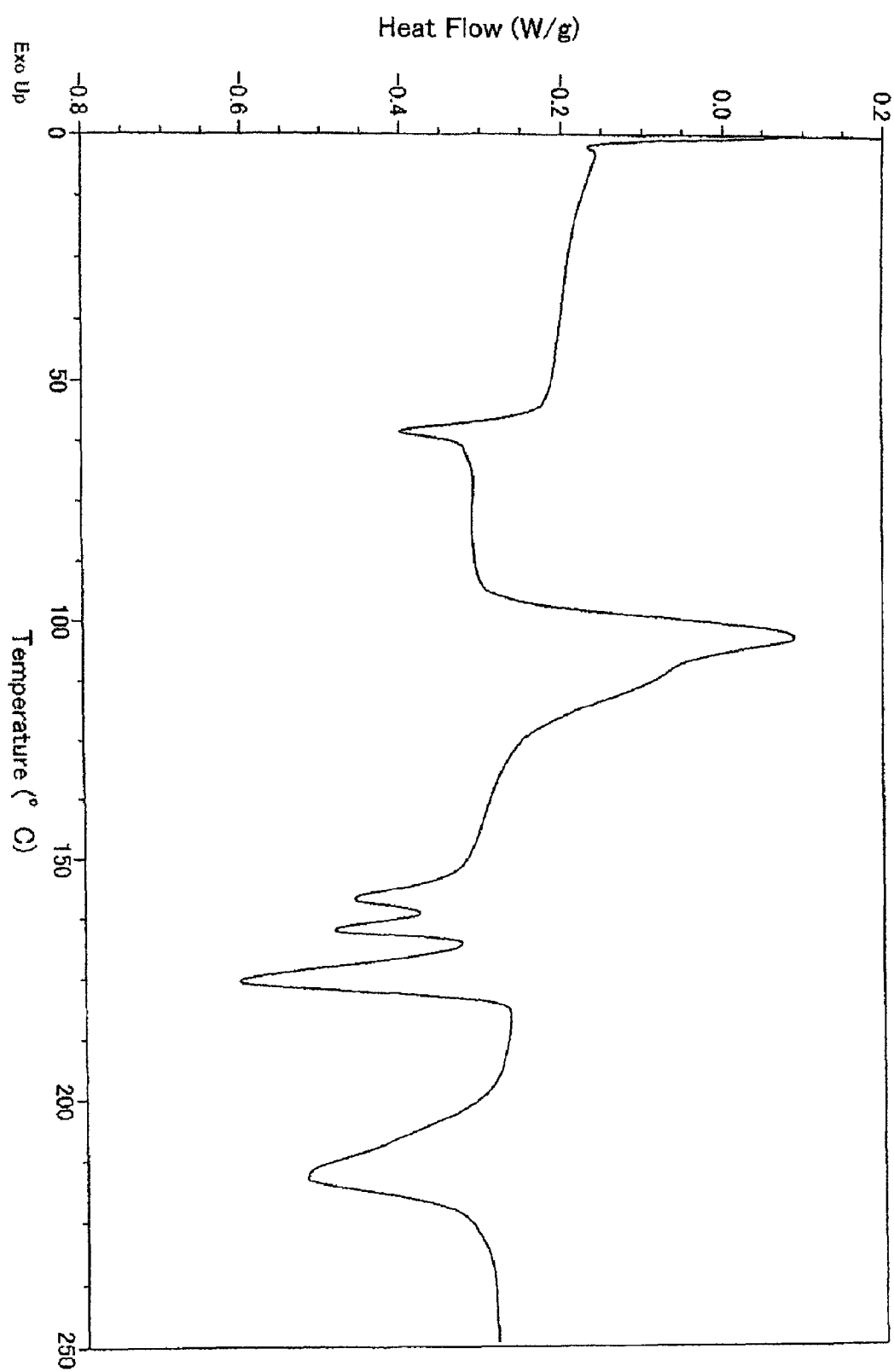
FIG. 5 is a drawing showing a chart indicating the results of DSC measurement during 1st heating of a pressed sheet of Example 2b.
Figure 6:
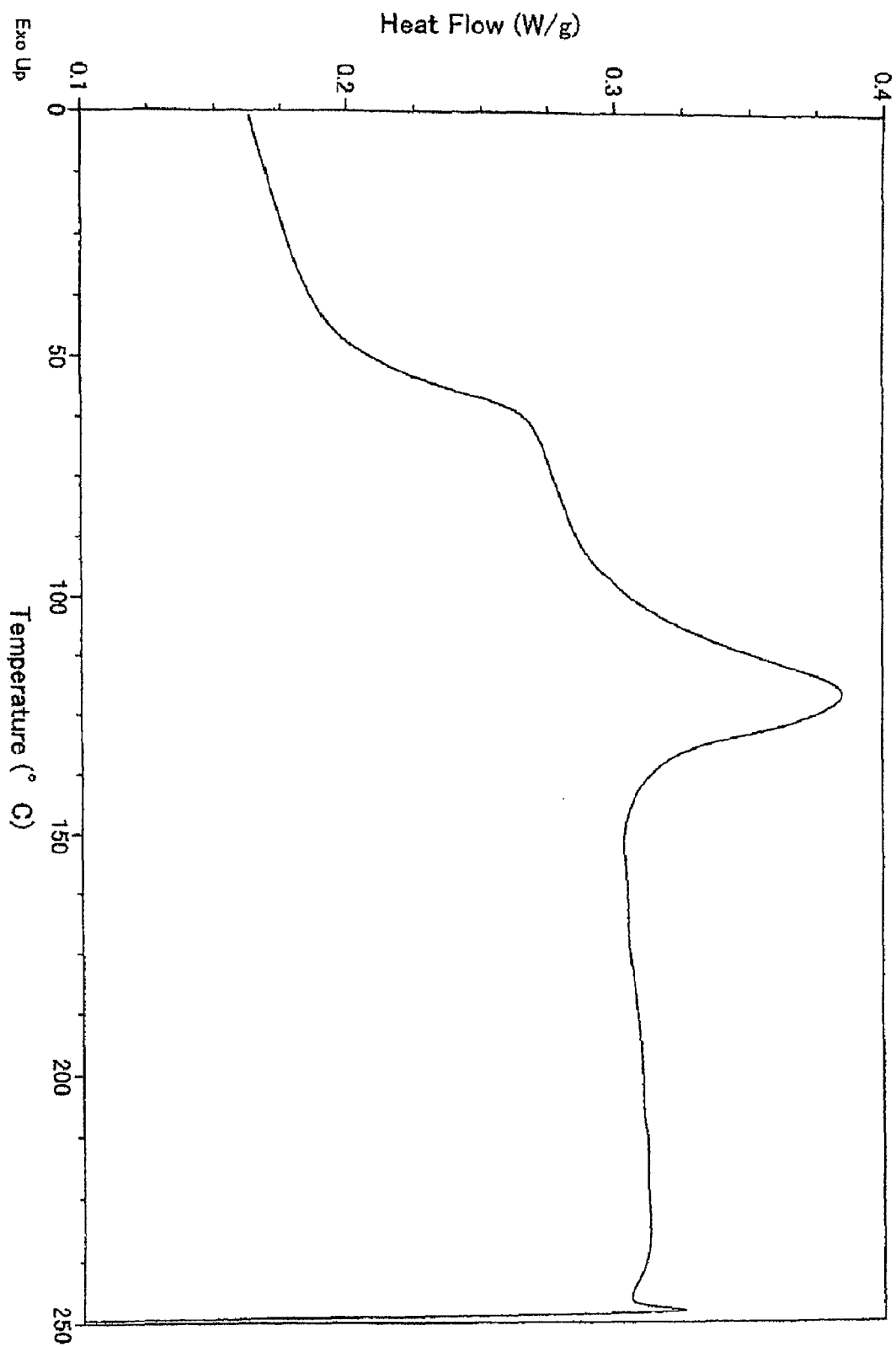
FIG. 6 is a drawing showing a chart indicating the results of DSC measurement during 1st cooling of a pressed sheet of Example 2b.
Figure 7:
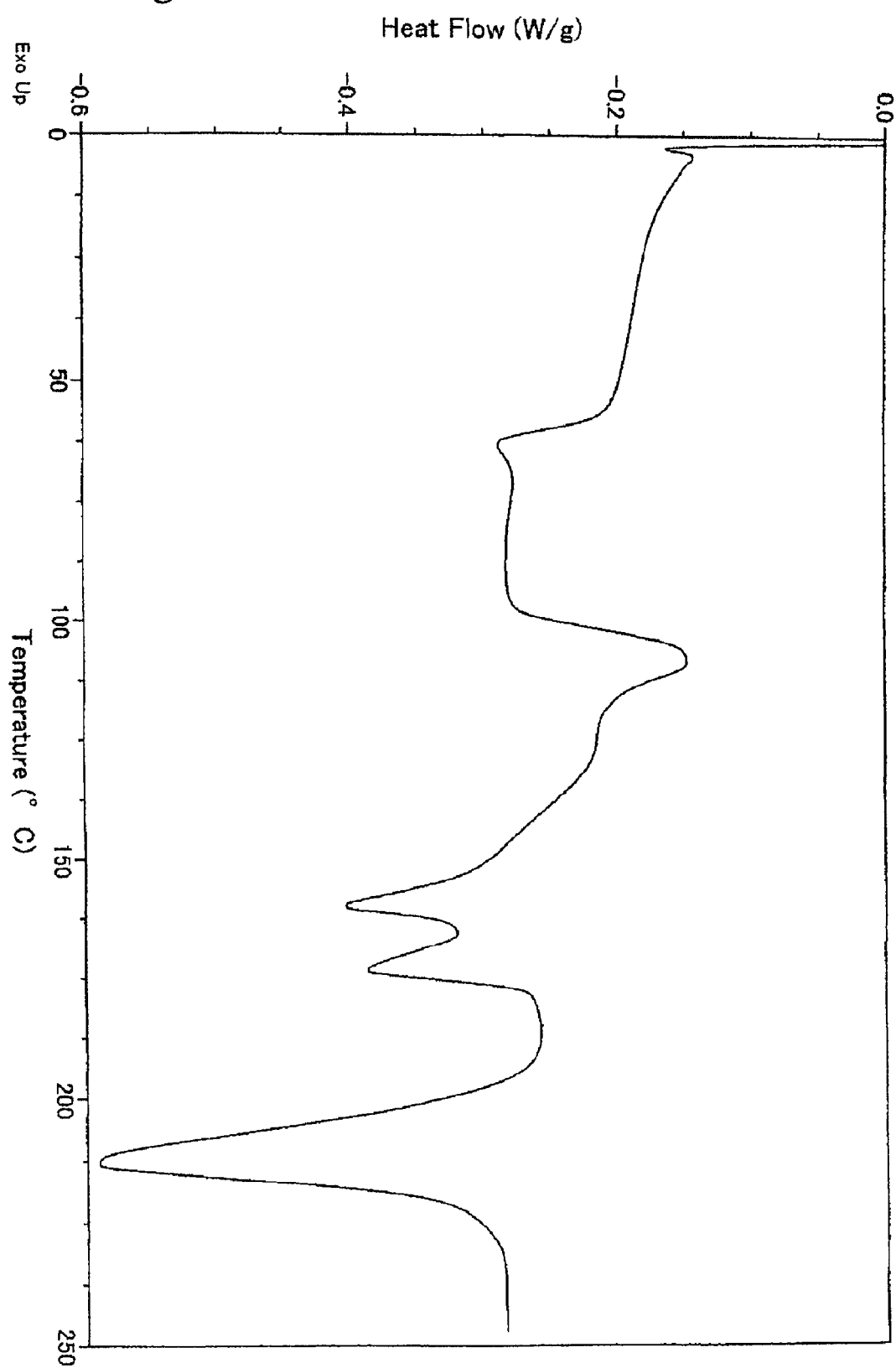
FIG. 7 is drawing showing a chart indicating the results of DSC measurement during 2nd heating of a pressed sheet of Example 2b.
Figure 8:
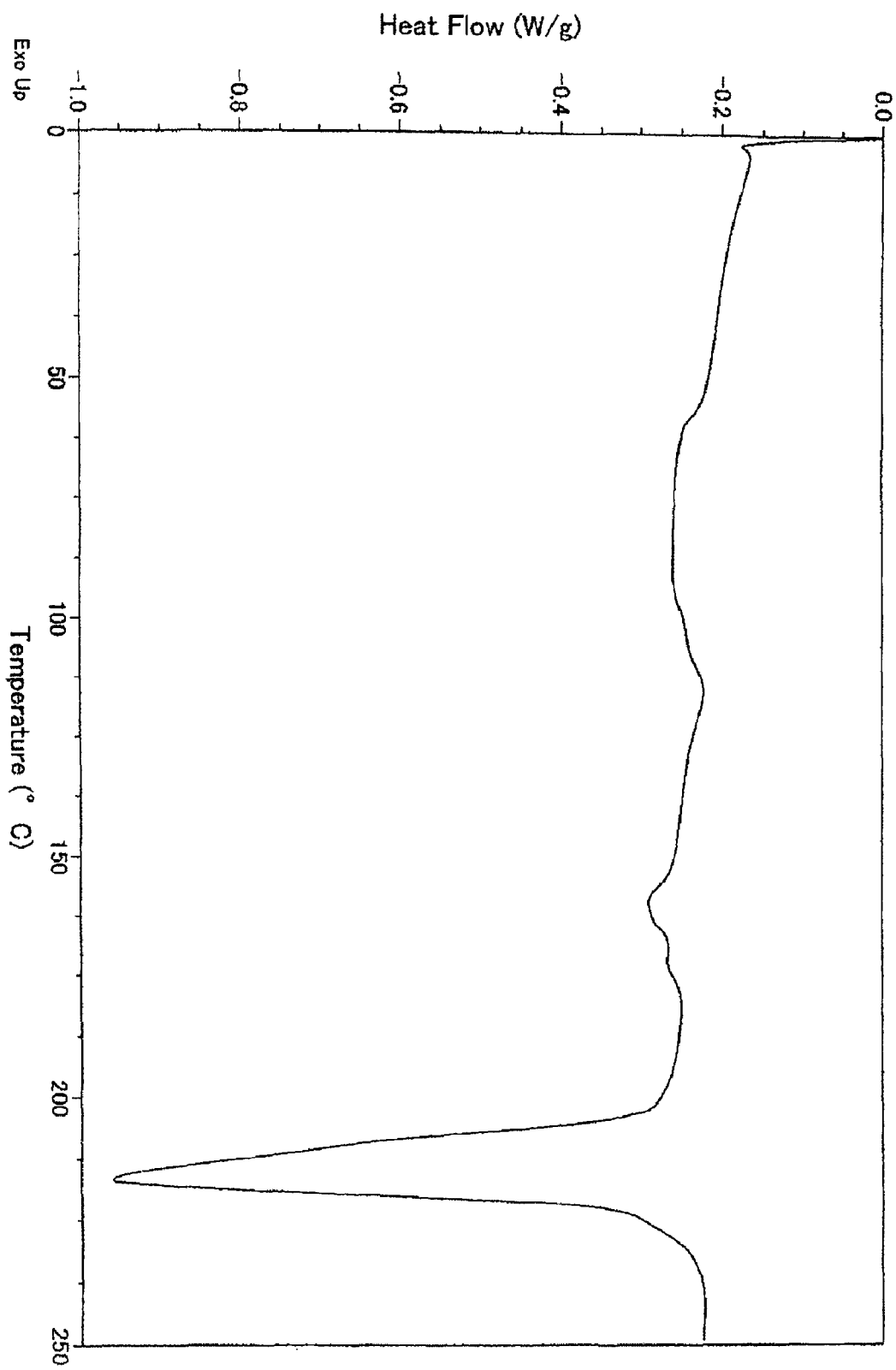
FIG. 8 is a drawing showing a chart indicating the results of DSC measurement during 1st heating of a pressed sheet of Example 2b.

The composition used for moldings of the present invention has specific thermal characteristics. The composition is presumed to have a stereocomplex structure, and in the present invention, this structure can be formed selectively. Moreover, the use of the present composition allows the obtaining of polylactic acid moldings having superior heat resistance, gas barrier properties, toughness, surface smoothness and transparency.

According to the present invention, a stereocomplex structure is thought to be selectively formed during crystallization from an amorphous state, and various moldings can be obtained having superior heat resistance and for which crystallization treatment is easy.

According to the present invention, biodegradable polymers can be provided capable of serving as heat-resistant moldings having a comparatively high molecular weight and demonstrating adequate strength and high melting point when used as moldings.

BEST MODE FOR CARRYING OUT THE INVENTION

Poly-L-Lactic Acid

In the present invention, poly-L-lactic acid (PLLA) is a polymer having L-lactic acid as a main constituent thereof, and preferably containing 95 mol % or more thereof. This is because there is the risk of a polymer in which the content of L-lactic acid is less than 95 mol % resulting in inferior heat resistance and gas barrier properties of films, sheets or other moldings obtained from a polylactic acid composition obtained by melting and mixing with poly-D-lactic acid (PDLA) to be described later, as well as inferior heat resistance of other moldings.

There are no particular limitations on the molecular weight of the PLLA provided a polylactic acid composition mixed with poly-D-lactic acid to be described later has film, sheet and other molding moldability, and the weight average molecular weight (Mw) is normally within the range of 6,000 to 1,000,000. In the present invention, poly-L-lactic acid having a weight average molecular weight of 6,000 to 500,000 is preferable. Furthermore, in the field of films, poly-L-lactic acid having a weight average molecular weight of less than 60,000 has the risk of causing the strength of a resulting stretched film to be inferior. On the other hand, poly-L-lactic acid having a weight average molecular weight in excess of 1,000,000 has the risk of increasing melt viscosity resulting in inferior molding processability.

Poly-D-Lactic Acid

In the present invention, poly-D-lactic acid (PDLA) is a polymer having D-lactic acid as a main constituent thereof, and preferably containing 95 mol % or more thereof. This is because there is the risk of a polymer in which the content of D-lactic acid is less than 95 mol % resulting in inferior heat resistance of a stretched film or other molding obtained by stretching a polylactic acid composition obtained by melting and mixing with the previously described poly-L-lactic acid.

There are no particular limitations on the molecular weight of the PDLA provided a polylactic acid composition mixed with the previously described PLLA has film and other molding moldability, and the weight average molecular weight (Mw) is normally within the range of 6,000 to 1,000,000. In the present invention, poly-D-lactic acid having a weight average molecular weight of 6,000 to 500,000 is preferable. Furthermore, in the field of films, poly-D-lactic acid having a weight average molecular weight of less than 60,000 has the risk of causing the strength of a resulting stretched film to be inferior. On the other hand, poly-D-lactic acid having a weight average molecular weight in excess of 1,000,000 has the risk of increasing melt viscosity resulting in inferior molding processability.

In the present invention, small amounts of other copolymer components, such as polyvalent carboxylic acids or esters thereof, polyvalent alcohols, hydroxycarboxylic acids or lactones, may be copolymerized in the PLLA and PDLA within a range that does not impair the object of the present invention.

Specific examples of polyvalent carboxylic acids include aliphatic dicarboxylic acids such as succinic acid, glutaric acid, adipic acid, pimelic acid, azelaic acid, suberic acid, decanedicarboxylic acid, dodecanedicarboxylic acid, sebacic acid, diglycolic acid, ketopimelic acid, malonic acid or methylmalonic acid, and aromatic dicarboxylic acids such as terephthalic acid, isophthalic acid or 2,6-naphthalenedicarboxylic acid.

Specific examples of polyvalent carboxylic acid esters include aliphatic dicarboxylic acid diesters such as dimethyl succinate, diethyl succinate, dimethyl glutarate, diethyl glutarate, dimethyl adipate, diethyl adipate, dimethyl pimelate, diethyl azelate, dimethyl suberate, diethyl suberate, dimethyl sebacate, diethyl sebacate, dimethyl decanedicarboxylate, dimethyl dodecanedicarboxylate, dimethyl diglycolate, dimethyl ketopimelate, dimethyl malonate or dimethyl methylmalonate, and aromatic dicarboxylic acid diesters such as dimethyl terephthalate or dimethyl isophthalate.

Specific examples of polyvalent alcohols include ethylene glycol, 1,3-propanediol, 1,2-propanediol, 1,3-butanediol, 2-methyl-propanediol, 1,4-butanediol, neopentyl glycol, pentamethylene glycol, hexamethylene glycol, octamethylene glycol, decamethylene glycol, dodecamethylene glycol, 1,4-cyclohexanediol, 1,4-cyclohexane dimethanol, diethylene glycol, dipropylene glycol, triethylene glycol, tetraethylene glycol, pentaethylene glycol and polyethylene glycol having a molecular weight of 1000 or less.

Specific examples of hydroxycarboxylic acids include glycolic acid, 2-methyl lactic acid, 3-hydroxybutyric acid, 4-hydroxybutyric acid, 2-hydroxy-n-butyric acid, 2-hydroxy-3,3-dimethyl butyric acid, 2-hydroxy-2-methyl butyric acid, 2-hydroxy-3-methyl butyric acid, hydroxypivalic acid, hydroxyisocaproic acid and hydroxycaproic acid.

Specific examples of lactones include various methylated caprolactones such as β-propiolactone, β-butyrolactone, γ-butyrolactone, β- or γ-valerolactone, δ-valerolactone, δ-caprolactone, ε-caprolactone, 4-methylcaprolactone, 3,5,5-trimethylcaprolactone or 3,3,5-trimethylcaprolactone, cyclic monomer esters of hydroxycarboxylic acid such as β-methyl-δ-valerolactone, enantolactone or laurolactone, and cyclic dimer esters of the above-mentioned hydroxycarboxylic acids such as glycolide, L-lactide or D-lactide.

In addition, the PLLA and PDLA as claimed in the present invention may also contain small amounts of D-lactic acid or L-lactic acid, respectively, provided the amounts thereof are within the previously described ranges.

Polylactic Acid Composition (A)

The polylactic acid composition used in the moldings of the present invention is characterized in that the peak in DSC measurement during cooling (at a rate of 10° C./min) after allowing to remain at 250° C. for 10 minutes is 30 mJ/mg or more, preferably 45 mJ/mg or more and particularly preferably 50 mJ/mg or more.

Moreover, a preferable composition of the present invention preferably has thermal characteristics such that, in measurement during the DSC 2nd heating (cooling at a rate of 10° C./min after allowing to remain at 250° C. for 10 minutes followed by reheating from 0° C. at a rate of 10° C./min), the peak ratio (peak 1/peak 2) of the peak when Tm is 150 to 180° C. (peak 1) to the peak when Tm is 200 to 240° C. (peak 2) is 0.5 or less, preferably 0.3 or less and particularly preferably 0.2 or less. This is thought to be due to the composition selectively forming stereocomplex crystals.

If the peak ratio (peak 1/peak 2) is greater than 0.5, the formed amount of PLLA and PDLA single crystals increases following crystallization, thereby resulting in the risk of the above-mentioned mixing being inadequate.

In addition, moldings comprised of a composition in which the peak ratio (peak 1/peak 2) is greater than 0.5 have a large amount of a crystals (single crystals of PLLA or PDLA) formed following crystallization, thereby resulting in the risk of inferior heat resistance.

In addition, the present invention also relates to moldings comprised of a polylactic acid composition characterized in that, the peak when Tm is 200 to 240° C. (peak 2) is 35 mJ/mg or more in measurement during the DSC 2nd heating (cooling at a rate of 10° C./min after allowing to remain at 250° C. for 10 minutes followed by reheating from 0° C. at a rate of 10° C./min).

A polylactic acid composition used in moldings of the present invention in this manner is comprised of 25 to 75 parts by weight, preferably 35 to 65 parts by weight and particularly preferably 45 to 55 parts by weight and more particularly preferably 47 to 53 parts by weight of the PLLA, and 75 to 25 parts by weight, preferably 65 to 35 parts by weight, particularly preferably 55 to 45 parts by weight, and more particularly preferably 53 to 47 parts by weight of the PDLA (based on 100 parts by weight of the total of PLLA PDLA).

These compositions are preferably prepared by mixing poly-L-lactic acid and poly-D-lactic acid in which the weight average molecular weights (Mw) of the poly-L-lactic acid and the poly-D-lactic acid are both within the range of 6,000 to 500,000, and the weight average molecular weight of either one of poly-L-lactic acid or poly-D-lactic acid is 30,000 to 500,000.

In addition, a polylactic acid composition used in the moldings of the present invention can be obtained by, for example, melting and mixing the PLLA and PDLA at 230 to 260° C. with a twin screw extruder, twin screw mixer, Banbury mixer or Plastomill.

If a composition in which the amount of PLLA exceeds 75 to 25 parts by weight, particularly 65 to 35 parts by weight and more particularly 55 parts by weight is mixed with a composition in which the amount of PLLA is less than 45 parts by weight using the previously described method, the heat resistance of the resulting composition may be inadequate. There is the risk of the moldings comprised of the resulting composition containing a crystals, thereby resulting in inadequate heat resistance. This is thought to be because the stereocomplex structure is comprised of equal amounts of PLLA and PDLA.

On the other hand, the temperature when melting and mixing the PLLA and PDLA is preferably 230 to 260° C. and more preferably 235 to 255° C. If the melting and mixing temperature is lower than 230° C., there is the risk of the stereocomplex structure remaining unmelted, while if the temperature is higher than 260° C., there is the risk of decomposition of the polylactic acid.

In addition, it is preferable to adequately melt and mix the PLLA and PDLA when preparing the polylactic acid composition of the present invention.

Since the composition used in moldings of the present invention demonstrates rapid stereocomplex crystallization as well as a large range over which stereocomplex crystallization can occur, it is thought that single crystals (α crystals) of PLLA or PDLA have difficulty in forming.

Moreover, the polylactic acid composition used in moldings of the present invention is such that the peak in DSC measurement during cooling (at a rate of 10° C./min) after allowing to remain at 250° C. for 10 minutes is 30 mJ/mg or more, preferably 45 mJ/mg or more and particularly preferably 50 mJ/mg or more, and crystallization of the polylactic acid composition occurs rapidly.

In addition, if the peak attributable to crystallization is smaller than 30 mJ/mg, the rate of crystallization is slow thereby resulting in the risk of the above-mentioned mixing being inadequate.

Moreover, a peak attributable to crystallization in measurement of DSC during cooling (at a rate of 10° C./min) after allowing to remain at 250° C. for 10 minutes is smaller than 30 mJ/mg, and depending on the molding field, moldings comprised of a composition in which the peak attributable to crystallization is smaller than 45 mJ/mg have the risk of inferior heat resistance due to a low crystallization rate and a small amount of crystal formed following crystallization of the molding.

In the present invention, DSC measurement is carried out using heating and cooling rates of 10° C./min. Furthermore, the heat of crystallization (measured value) typically increases the slower the heating and cooling rates. For example, a sample for which the heat of crystallization was 61.7 J/g (cooling rate: 10° C./min) in the 1st cooling of Example 2a demonstrated a value of 70.6 J/g during measurement using a cooling rate of 5° C./min. When comparing heat of crystallization (measured values) by DSC, it is necessary to compare measured values for which the respective heating and cooling rates are the same.

There are no particular limitations on the weight average molecular weight of the polylactic acid composition used in the present invention. However, the composition of the present invention preferably has a weight average molecular weight within the range of 10,000 to 300,000. In addition, in the field of films, the weight average molecular weight is preferably within the range of 100,000 to 150,000.

In addition, a preferable method for preparing a composition used in the moldings of the present invention consists of preparing the composition by melting and mixing such that the weight average molecular weight of the resulting composition is within the range of 0.3 to 0.6 times, and preferably within the range of 0.4 to 0.6 times, the value of the weight average molecular weight obtained by weight-averaging the weight average molecular weights of the poly-L-lactic acid and poly-D-lactic acid used. In a composition obtained according to the present invention, the poly-L-lactic acid and the poly-D-lactic acid are in an extremely finely fused state.

For example, in the case the weight average molecular weight of the poly-D-lactic acid is greater than the weight average molecular weight of the poly-L-lactic acid, and particularly in the case of using poly-L-lactic acid having a weight average molecular weight of 150,000 to 200,000 and poly-D-lactic acid having a weight average molecular weight of 200,000 to 350,000 at a weight ratio of poly-L-lactic acid to poly-D-lactic acid of 45/55 to 55/45, a composition obtained by mixing these, and particularly preferably by mixing using a twin screw extruder or twin screw mixer, is in a state in which the poly-L-lactic acid and the poly-D-lactic acid are finely fused as indicated below.

Namely, when this composition is rapidly cooled at 0 to 30° C. after pressing at 240 to 260° C., and the resulting pressed sheet is observed with a scanning electron microscope (SEM) 48 days after decomposing the poly-L-lactic acid using an enzyme that decomposes poly-L-lactic acid, micropores are observed to be formed while pores having a diameter of 5 μm or more are not observed. These micropores normally have a diameter of about 0.1 to 3 μm, and this is clear since there are 20 to 200 such micropores per 5 μm×5 μm area. This is due to the absence of a portion comprised of poly-L-lactic acid alone, or even if present, due to the difficulty for removal by enzyme decomposition to occur since it is only present in extremely small amounts.

A thermal deformation test in the present invention was carried out using a thermal analyzer (Seiko Instruments Inc., Heat, Stress and Strain Measuring System, TMA/SS120) by cutting out a test piece having a width of 4 mm from a film, applying a load of 0.25 MPa to the test piece at an interchuck distance of 10 mm, heating starting at a temperature of 30° C. (starting temperature) at a rate of 5° C./min, and measuring deformation (elongation and contraction) of the test piece at each temperature. Deformation was indicated as the deformation rate of the test piece. Deformation rate (%) was calculated according to amount of deformation (direction of elongation)/interchuck distance×100(%).

Fracture energy (mJ) in the present invention was measured by cutting out an area surrounded by a tensile stress-strain curve and the horizontal axis (strain), and measuring the weight thereof (W−1), from a tensile stress-strain curve obtained by measuring a test piece having a length of 50 mm and width of 15 mm at an interchuck distance of 20 mm and pulling speed of 300 mm/min using a tensile tester (Orientech, Tensilon Universal Tester, RTC-1225).

Next, an area surrounded by tensile strength (MPa) and elongation (%) was cut out and the weight thereof (W−2) was measured, followed by determining fracture energy (mJ) from the ratio of (W−1) to (W−2). Furthermore, in order to determine fracture energy (mJ), elongation (%) was converted to the distance required for fracture (mm).

Moldings

The polylactic acid composition of the present invention is used for various types of moldings obtained injection, blow molding, extrusion molding, vacuum molding, air pressure molding, vacuum molding or air pressure molding after having weakly stretched 1.1 to 1.5 times and various other molding methods.

Typically used injection molding methods, injection compression molding methods or gas-assisted molding methods can be employed for injection molding. Moreover, two-color molding, in-mold molding and gas press molding can also be employed. In addition, the resin temperature inside the cylinder preferably exceeds 200° C. and normally is 200 to 250° C. to avoid crystallization and thermal decomposition.

In the present invention in particular, an injection molding machine is preferably used in which the temperature of at least one of the zones at the end of the cylinder is preferably 200 to 240° C. and particularly preferably 210 to 220° C., while the temperature of the zone on the hopper side (supply side) is 230 to 250° C. Furthermore, it is preferable to inject a melted composition of the present invention at a temperature near the melting point of polylactic acid having a stereocomplex structure.

Moreover, the mold temperature is preferably set to 100 to 160° C., and crystallization is preferably allowed to proceed by retaining within the mold for 10 seconds to 3 minutes.

Injection moldings may be crystallized by subjecting to heat treatment. Crystallizing moldings in this manner makes it possible to further improve the heat resistance of the moldings. Crystallization treatment can be carried out in the mold during molding and/or after the molding has been removed from the mold. In terms of productivity, it is preferable to carry out crystallization treatment after having removed the molding from the mold in the case the crystallization rate of the resin composition used to mold the injection molding is slow, while on the other hand, crystallization treatment may be carried out in the mold if the crystallization rate is fast.

In the case of carrying out crystallization treatment after having removed the molding from the mold, the temperature of heat treatment is preferably within the range of 60 to 180° C. If the heat treatment temperature is lower than 60° C., crystallization may not proceed in the molding step, while if the temperature exceeds 180° C., deformation and contraction may occur when cooling the molding. Although heating time is suitably determined according to the composition of the resin comprising the injection molding and the heat treatment temperature, in the case of a heat treatment temperature of 70° C., for example, heat treatment is carried out for 15 minutes to 5 hours. In addition, heat treatment is carried out for 10 seconds to 30 minutes in the case the heat treatment temperature is 130° C.

Among these injection moldings, transparency in terms of a total transmittance (TT) of 60% or more at a thickness of 3 mm is preferable in the case of using for a container and the like since it allows the contents to be visualized.

In addition, preferable examples of methods for contacting a sheet with a mold during vacuum/air pressure molding include vacuum molding, air pressure molding and press molding for reasons such as high quality of the resulting moldings and high productivity.

In vacuum molding, a general-purpose molding machine for plastic molding can be used satisfactorily, and molding is preferably carried out by preheating the sheet to a sheet surface temperature at the time of sheet fabrication of 110 to 150° C. using a hot plate or hot air, and adhering to the cavity at a cavity temperature of 100 to 150° C. In the cavity, molding is carried out by decompressing the inside of the cavity by providing a large number of pores therein, thereby allowing the obtaining of containers having satisfactory mold reproducibility.

In addition, in vacuum molding, reduced thickness of the sheet caused by local stretching can be prevented by providing a pushing apparatus referred to as a plug.

In air pressure molding as well, a general-purpose molding machine for plastic molding can be used satisfactorily, and moldings having satisfactory mold reproducibility can be obtained by plasticizing the sheet with a hot plate followed by allowing air pressure to act on the sheet surface from a large number of pores provided throughout the hot plate, thereby subjecting the sheet to indentation molding.

Among Vacuum/air pressure moldings obtained in this manner, moldings having superior heat resistance so as to be deformed by hot water (98° C.) are preferable.

Improvement of Heat Resistance by Inorganic Filler

In another aspect thereof, the present invention relates to a polylactic acid-based molding incorporating an inorganic filler such as glass fiber, and to a molding having improved heat resistance.

Thus, in the present invention, the use of a polylactic acid composition is proposed that contains poly-L-lactic acid and poly-D-lactic acid, and contains a polylactic acid composition (A) and an inorganic filler (B) in which the peak during cooling (at a rate of 10° C./min) after allowing to remain for 10 minutes at 250° C. in DSC measurement is 30 mJ/mg or more.

The polylactic acid composition (A) used is has been previously explained.

The incorporation of the inorganic filler (B) in the polylactic acid composition (A) results in superior biodegradability and heat resistance, and allows use in a wider range of applications such as engineering plastics for which polylactic acid was unable to be used in the past.

The following provides an explanation of the inorganic filler (B) used in the present invention.

Inorganic Filler (B)

A known inorganic filler conventionally incorporated for thermoplasticity of polypropylene or polyethylene terephthalate and the like can be used for the inorganic filler (B) used in the present invention, specific examples of which include particulate fillers such as talc, calcium carbonate, barium sulfate, kaolin, titanium oxide, hollow glass balloons, glass beads, carbon black or magnesium hydroxide, whisker-like fillers such as potassium titanate, Mos-Hige, plate-like fillers such as montmorillonite or mica, and fibrous fillers such as glass fiber, carbon fiber or metal fiber. Other examples include clay, diatomaceous earth, wallastonite, hydrotalcite, magnesium oxide, titanium oxide, aluminum hydroxide, silicon dioxide, calcium silicate, aluminum silicate, porous silica, aluminum sulfate, calcium sulfate, calcium carbonate, magnesium carbonate, molybdenum disulfide, graphite, Shirasu balloons and glass balloons. Glass fiber, carbon fiber, mica, talc and calcium carbonate are preferable. One type of these inorganic fillers can be used alone or two or more types can be used in combination. The particle diameter, particle size distribution and so forth of these inorganic fillers (B) can be suitably determined according to the application.

For example, in the case of an inorganic filler (B) in the form of a powder or flakes, the mean particle diameter is normally about 0.01 to 200 μm and preferably 1 to 50 μm. In addition, the particle size distribution of these inorganic fillers in the case of fine particles is preferably uniform and the particles are easily dispersed.

Moreover, pretreatment of the surface of these inorganic fillers (B) with a coupling agent such as a silane compound, a binder such as epoxy resin, the above-mentioned poly-L-lactic acid or poly-D-lactic acid, or polylactic acid containing a stereocomplex yields a composition having superior uniform mixing, adhesion and impact properties.

There are no particular limitations on the coupling agent, and those having an amino group are used preferably, preferable examples of which include aminosilanes such as γ-aminopropyltriethoxysilane, N-β-(aminoethyl)-γ-aminopropyltrimethoxysilane, N-β-(aminoethyl)-N-β-(aminoethyl)-γ-aminopropyltrimethoxysilane or γ-anilinopropyltrimethoxysilane.

There are no particular limitations on the binder, and epoxy resin is used preferably. Examples of epoxy resins include bisphenol A epoxy resin, bisphenol F epoxy resin, bisphenol AD epoxy resin and phenol novolak epoxy resin. The proportions of these coupling agents and binders are normally about 0.1 to 2% by weight as the solid content thereof based on glass fiber.

The content of the inorganic filler (B) is preferably 5 to 60% by weight, more preferably 5 to 30% by weight, and particularly preferably 8 to 20% by weight based on a value of 100% by weight for the total of the polylactic acid composition (A) and the inorganic filler (B).

If the content of the inorganic filler (B) is 5.0% by weight or less, the effect of improving mechanical strength cannot be said to be adequate, while if the content thereof exceeds 50.0% by weight, moldability may be restricted.

In the present invention, glass fibers, and particularly glass short fibers, are preferable as inorganic filler.

Such glass fibers normally have a monofilament mean diameter of about 5 to 30 μm. In addition, in the case of using glass short fibers, the length thereof can be suitably selected according to the extruding machine used for mixing and the like, and is typically about 1.5 to 6 mm.

These glass fibers are preferably surface-treated with a coupling agent, binder or polylactic acid and the like as previously described.

In the present invention, glass short fibers are also used in combination with hollow glass balloons or talc for the inorganic filler (B). The incorporated proportion of hollow glass balloons or talc in the case of using in combination with glass short fibers is preferably 5 to 30% by weight of glass short fibers and preferably 5 to 25% by weight, and particularly preferably 7.5 to 20% by weight, of hollow glass balloons or talc based on a value of 100% by weight for the total of the polylactic acid composition (A) and the inorganic filler (B).

Composition Incorporating Inorganic Filler (B) in Polylactic Acid Composition (A)

A composition incorporating an inorganic filler of the present invention is preferably used in terms of efficiency by mixing the polylactic acid composition (A) preferably with the inorganic filler (B) subjected to the previously described treatment followed by kneading and preferably linearly extruding into pellets. The mixing and kneading temperature is normally 230 to 250° C.

A composition incorporating an inorganic filler of the present invention is molded to an arbitrary shape, examples of which include strands, sheets, plates and pellets. In particular, pellets having a diameter of about 1.5 to 4.5 mm and a length of about 2 to 50 mm are preferable in terms of handling in order to use for injection molding.

Furthermore, a stabilizer such as an antioxidant, ultraviolet absorber or photostabilizer, a flame retardant such as a bromine-based flame retardant, phosphorous-based flame retardant or melamine compound, a crystal nucleator, an antistatic agent, a lubricant, a plasticizer, a mold release agent, a coloring agent such as a dye or pigment, a nucleating agent such as an organic carboxylic acid metal salt, plasticizer, a terminal blocking agent such as an epoxy compound, an oxazoline, a carbodiimide compound, or other resin and the like may be added to a composition incorporating an inorganic filler of the present invention provided it does not impair the object of the present invention.

A composition incorporating an inorganic filler of the present invention can be used in various types of moldings. Namely, various types of molding can be molded by extrusion molding using an extruding machine such as a single screw extruder or twin screw extruder, hollow molding, injection molding, sheet molding, thermoforming, rotational molding or lamination molding and the like. These moldings incorporating an inorganic filler are preferably heat-treated after molding. The temperature of heat treatment is preferably equal to or higher than the crystal melting temperature of α crystals of poly-L-lactic acid, and is normally about 160 to 220° C.

As a result of heat treating in this manner, the heat resistance of the molding is further improved, and moldings can be obtained in which the temperature of a heat deflection test (HDT: low load) is 190° C. or higher.

Injection moldings, blow moldings, vacuum/air pressure moldings and extrusion moldings provided in the present invention can be various types of moldings such as sheets, films, threads, tapes, woven fabrics, non-woven fabrics or foamed moldings for various packaging applications for electrical and electronic components, exterior products, automotive interior products, industrial uses and food uses. Moreover, various spinning methods known in the prior art, such as conjugate spinning or spunbond spinning, can be used for spinning.

Other materials can also be laminated onto films or other moldings of the present invention as necessary. For example, moldings of the present invention can be laminated with a layer of polyolefin or other biodegradable plastic or an inorganic thin film layer.

In particular, a laminate having superior gas barrier properties is provided by providing a layer of a polymer of acrylic acid or other unsaturated carboxylic acid or derivative thereof or a layer of an inorganic thin film, examples of which include polymers comprised of unsaturated carboxylic acids and derivatives thereof, unsaturated carboxylic acids such as acrylic acid, methacrylic acid, maleic acid or itaconic acid and metal salts thereof, polymers obtained by polymerizing metal salts such as those of strontium, magnesium or zinc, and layers having gas barrier properties obtained by polymerizing monomers thereof in the presence of a polymer such as polyvinyl alcohol.

Inorganic Thin Film Layer

An inorganic thin film layer has an inorganic material such as a metal, metal oxide, metal nitride or metal carbide and the like formed in the form of a thin coating on a film, and there are no particular limitations thereon provided the coating is able to impart gas barrier properties to the film or other moldings. Specific examples of metals include aluminum, nickel, titanium, copper, gold and platinum, while specific examples of metal oxides include silicon oxide, aluminum oxide and titanium oxide.

In selecting a specific material of a metal, metal oxide, metal nitride or metal carbide, an overall judgment is made of the physical properties required of the laminated film and adhesion between both layers. For example, aluminum is suitable when desiring to impart high gas barrier properties. However, in cases in which high transparency is also simultaneously required, inorganic oxides, and particularly silicon oxide and aluminum oxide, are advantageous.

Moreover, various types of adhesives can be anchor-coated to increase adhesion with the film base material layer.

In addition, silicon oxides may not only be compounds represented by SiO or $SiO_2$, but also compositions represented by the compositional formula $SiO_X$ (wherein, X is 1.0 to 2.0). For example, a composition in which the ratio of SiO to $SiO_2$ is 1:1 can be used. These inorganic thin films can be formed by various methods known in the prior art, such as deposition, sputtering or Cat-CVD.

A laminated film in which a gas barrier layer as described above is laminated onto a film of the present invention can be used in various applications, examples of which include packaging materials for dried foods, aqueous foods, boiled retorted foods and food supplements, packaging materials for toiletry products such as shampoos, soaps, bath additives or air fresheners, packaging materials for pharmaceuticals such as powders, granules or tablets, packaging materials for liquid pharmaceuticals such as infusion bags, packaging bags for medical instruments, packaging materials for electronic components such as hard disks, wiring boards and printed circuit boards, barrier layer materials for liquid crystal displays, plasma displays, inorganic or organic EL displays, or electronic paper, barrier materials for other electronic materials, barrier materials for vacuum thermal insulators, packaging materials for industrial products such as ink cartridges, barrier materials for solar cells or fuel cells, and backing sheets.

EXAMPLES

Although the following provides a more detailed explanation of the present invention through examples thereof, the present invention is not limited to these examples with the provision that they do not exceed the gist thereof.

The polylactic acid used in the examples and comparative examples is as described below.
(a) Poly-L-lactic acid (PLLA-1): D form: 1.9%, Mw: 183,000 (222,000) (g/mol), Tm: 162.9° C. and Tg: 58.1° C.
(b) Poly-D-lactic acid (PDLA-1, PURAC): D form: 100.0%, Mw: 323,000 (404,000) (g/mol), Tm: 178.4° C. and Tg: 59.2° C.

Measurement methods used in the present invention are as indicated below.
(1-1) Weight Average Molecular Weight (Mw)

The following measurement is a typical polymer molecular weight measurement method, and the measurement results are shown in parentheses.

10 ml of GPC eluent were added to 20 mg of sample and allowed to stand undisturbed overnight followed by gently agitating by hand. This solution was then filtered with an amphiphilic 0.45 μm PTFE filter (Advantec DISMIC-25HP045AN) to obtain a GPC sample solution.

Measuring apparatus: Shodex GPC System 21 Analyzer
 Data analysis program: SIC480 DataStation II
 Detector: Differential refractive index detector (RI)
 Column: Shodex GPC K-G+K-806L+K-806L
 Column temperature: 40° C.
 Eluent: Chloroform
 Flow rate: 1.0 ml/min
 Injection volume: 200 μL
 Molecular weight calibration: Monodispersed polystyrene
(1-2) Weight Average Molecular Weight (Mw)

The following measurement is suitable for measurement of polylactic acid stereocomplex structures in particular, and measurement results are shown without parentheses.

20 mg of sample were dissolved in a mobile phase (concentration: 0.5%) and filtered with a 0.45 μm hydrophilic PTFE filter (Millex-LH, Nihon Millipore) to obtain a GPC sample solution.

Column: PL HFIPgel (300×7.5 mm), two columns (Polymer Laboratories)
 Column temperature: 40° C.
 Mobile phase: HFIP+5 mM TFANa
 Flow rate: 1.0 ml/min
 Detection: RI
 Injection volume: 50 μL
 Measuring apparatus: 510 hydraulic pump, U6K water dispenser, 410 differential refractometer (Nihon Waters)
 Molecular weight calibration: Monodispersed PMMA (EasiCal PM-1, Polymer Laboratories)
(2) DSC Measurement Using the Model Q100 manufactured by TA Instruments for the differential scanning calorimeter (DSC), about 5 mg of sample were weighed out and melted by heating from 0° C. to 250° C. at a heating rate of 10° C./min under conditions of a nitrogen gas inflow rate of 50 ml/min in compliance with JIS K 7121, followed by holding for 10 minutes at 250° C., crystallizing by cooling to 0° C. at a cooling rate of 10° C./min and then reheating to 250° C. at a heating rate of 10° C./min to obtain a melting curve, after which the sample melting point (Tm), peak height during the 2nd heating at the melting point, glass transition temperature (Tg), crystallization temperature (Tc) during cooling, and calorific value (Hc) were determined from the resulting melting curve.

Furthermore, peak height was determined as the height from the baseline obtained by connecting the baseline in the vicinity of 65 to 75° C. and the baseline in the vicinity of 240 to 250° C.

(3) Transparency

Haze value (Hz) and parallel transmittance (PT) of a film were measured using the 300A Hazemeter manufactured by Nippon Denshoku Industries. In addition, total transmittance (TT) was also measured.

(4) Processability During Injection Molding (Mold Opening)

Molding opening was evaluated as being satisfactory if the resulting molding when the mold was opened following injection and filling was in solid form. In addition, mold opening was evaluated as being poor if the molding had softened, become deformed after being removed from the mold, or was unable to be removed with a Z-pin and ended up remaining in the mold.

(5) Heat Resistance of Vacuum Moldings

The heat resistance of vacuum moldings (containers) was measured by confirming whether or not deformation of the container occurs when filled to a depth of 6 cm with hot water at 98° C.

However, the container was filled to a depth of 3 cm in Example 10 due to the use of a shallow container.

○: No deformation
 Δ: Slight deformation (mainly in bottom)
 x: Considerable deformation (causing container to tilt and water to spill)

Example 1

<Production of Polylactic Acid Composition>

PLLA-1 and PDLA-1 were weighed at a ratio of 50:50 (wt %) and mixed and extruded under conditions of C1 to C12 of 250° C. and 430 rpm at a feed speed of 120 g/min using a co-rotating twin screw extruder (TEM-37BS) manufactured by Toshiba Machine Co., Ltd. (screw diameter: 37 mm, number of screw threads: 2, screw length (l/d): 42, screw pattern comprised of a threaded portion: 882 mm and mixing portion: 644 mm), followed by inserting and fastening a tin alloy plate having a thickness of 0.5 mm on the lip of a coat hanger T-die having a width of 400 mm using a single-screw mixing extruder (SE-50C, screw diameter: 50 mm, screw length (l/d): 28) on the end thereof for use with a width of 280 mm, and molding at a rate of 1.0 m/min with a mirrored chilled roller (water temperature: 15° C.) to obtain a non-stretched sheet having a thickness of about 300 μm.

The results are shown in Table 1.

TABLE 1

|  | Example 1 |
|---|---|
| Composition Evaluation (DSC) | |
| 1st cooling | |
| ΔHc (J/g) | 29.0 |
| 2nd heating | |
| ΔHm SC (J/g) | 48.3 |
| Δh α (J/g) | 0 |
| 2nd heating peak height (W/g) | |
| Tm = 150 to 180° C. | 0 |
| Tm = 200 to 250° C. | 0.776 |
| Peak height ratio | 0 |

DSC measurement was carried out on the non-stretched sheet removed from the die. In looking at the peak height of the 2nd heating, the only peak was when Tm is 200 to 250° C., thus indicating a composition in which stereocomplex crystals were formed selectively.

Example 2a

<Production of Polylactic Acid Composition>

80 g of PLLA-1 and PDLA-1 were weighed at a ratio of 50:50 (wt %) followed by melting and mixing for 15 minutes under conditions of 250° C. and 60 rpm using the Laboplastomill Model C (twin screw mixer) manufactured by Toyo Seiki Co. to obtain a polylactic acid composition (Composition 2a).

<Production of Pressed Sheet>

After sandwiching Composition 2a between 50 μm polyimide film (Ube Industries, trade name: Upilex 50S), the sandwiched composition was placed in a stainless steel rectangular flask having a thickness of 0.5 mm and measuring 270 mm×270 mm followed by press molding under conditions of a press temperature of 250° C., initial pressurization time of 3 minutes (pressure: 0), 5 cycles of gas venting, pressing time of 4 minutes (pressure: 100 kgf) and cooling time of 5 minutes (pressure: 10 kgf) to obtain a pressed sheet (Pressed Sheet 2a).

Example 2b

Example 2b was carried out in the same manner as Example 2a with the exception of changing the mixing time to 3 minutes.

The results for Examples 2a and 2b are shown in Table 2.

TABLE 2

|  | Example 2a | Example 2b |
|---|---|---|
| Composition | | |
| PLLA-1 (wt %) | 50 | 50 |
| PDLA-2 (wt %) | 50 | 50 |
| (1) Mixing Conditions | | |
| Mixing temperature (° C.) | 250 | 250 |
| Mixing rate (rpm) | 60 | 60 |
| Mixing time (min) | 15 | 3 |
| (2) DSC Measurement Results | | |
| Pressed sheet | | |
| 1st heating | | |
| ΔHm1 (J/g) | 0 | 23.4 |
| ΔHm2 (J/g) | 56.6 | 18.6 |
| Peak height (Tm = 150 to 180° C.) (W/g) | 0 | 0.304 |
| Peak height (Tm = 200 to 250° C.) (W/g) | 0.723 | 0.234 |
| Peak height ratio (-) | 0 | 1.299 |
| 1st cooling | | |
| ΔHc (J/g) | 61.7 | 15.1 |
| 2nd heating | | |
| ΔHm1 (J/g) | 0 | 10 |
| ΔHm2 (J/g) | 62.1 | 24.5 |
| Peak height (Tm = 150 to 180° C.) (W/g) | 0 | 0.116 |
| Peak height (Tm = 200 to 250° C.) (W/g) | 0.936 | 0.304 |
| Peak height ratio (-) | 0 | 0.382 |

As is clear from Table 2, the stretched film or example 2a comprised of Pressed Sheet 2 having a peak during cooling (at a rate of 10° C./min) after 10 minutes in DSC measurement of the pressed sheet of 45 J/g or more, but not having a peak during the 2nd heating when Tm is 150 to 180° C., demonstrated superior surface smoothness, having a surface roughness (SRa) of 0.1 μm or less, and superior transparency, having a haze value of 3%.

On the other hand, in DSC measurement of Example 2b following heat treatment for 30 minutes at 200° C. after stretching, although numerous stereocomplex crystals appeared to have formed since the ΔHm2 was large at 56 J/g and the peak height ratio was 0.1 or less, in a comparison of film physical properties in Example 17b, Example 17a was determined to be superior in terms of film strength, haze value, surface roughness and heat resistance.

Example 3

<Production of Chips for Injection Molding>

After crushing a sheet having a thickness of about 300 μm produced in Example 1, the crushed sheet was press molded at a thickness of about 1 mm for 5 minutes at 250° C. with a press molding machine and then cut into chips for use as the raw material.

<Injection Molding>

Molding was carried out under the following conditions using the Model Ti-80 Injection Molding Machine manufactured by Toyo Seiki Co. A specimen mold having a thickness of 3 mm was used for the mold.

Cylinder temperatures: C1 (end)/C2/C3/C4/C5 (hopper side)=215/215/215/215/235 (° C.)

Mold temperature: 130 (° C.)

In-mold crystallization time: 1 (min)

Rate at switching positions from 0 to 40 mm: 50(%), pressure: (kgf), timer: 5 (sec)

Rate at switching positions from 40 to 40 mm: 50(%), pressure: (kgf), timer: 10 (sec)

Rate at switching positions from 40 to 70 mm: 50(%), pressure: (kgf), timer: 4 (sec)

Rate at charging position of 70 mm: 50(%), timer: 10 (sec)

Suckback (0 mm position): 50(%), timer: 170 (sec)

Example 4

Example 4 was carried out in the same manner as Example 3 with the exception of changing the mold temperature to 120 (° C.).

Example 5

Example 5 was carried out in the same manner as Example 3 with the exception of changing the mold temperature to 120 (° C.) and changing the in-mold crystallization time to 3 (min).

Example 6

Example 6 was carried out in the same manner as Example 3 with the exception of changing the mold temperature to 110 (° C.) and changing the in-mold crystallization time to 3 (min).

Comparative Example 1

Comparative Example 1 was carried out in the same manner as Example 18 with the exception of changing the cylinder temperatures of C1 (end)/C2/C3/C4/C5 (hopper side) to 250/250/250/250/250 (° C.) and changing the mold temperature to 60 (° C.).

Comparative Example 2

Comparative Example 2 was carried out in the same manner as Example 18 with the exception of changing the cylinder temperatures of C1 (end)/C2/C3/C4/C5 (hopper side) to 250/250/250/250/250 (° C.) and changing the mold temperature to 80 (° C.).

Comparative Example 3

Comparative Example 3 was carried out in the same manner as Example 3 with the exception of changing the cylinder temperatures of C1 (end)/C2/C3/C4/C5 (hopper side) to 250/250/250/250/250 (° C.), changing the mold temperature to 80 (° C.) and changing the in-mold crystallization time to 3 (min).

Comparative Example 4

Comparative Example 4 was carried out in the same manner as Example 3 with the exception of changing the cylinder temperatures of C1 (end)/C2/C3/C4/C5 (hopper side) to 250/250/250/250/250 (° C.), changing the mold temperature to 90 (° C.) and changing the in-mold crystallization time to 3 (min).

Comparative Example 5

Comparative Example 5 was carried out in the same manner as Example 3 with the exception of changing the cylinder temperatures of C1 (end)/C2/C3/C4/C5 (hopper side) to 250/250/250/250/250 (° C.), changing the mold temperature to 100 (° C.) and changing the in-mold crystallization time to 3 (min).

Comparative Example 6

Comparative Example 6 was carried out in the same manner as Example 3 with the exception of changing the cylinder temperatures of C1 (end)/C2/C3/C4/C5 (hopper side) to 230/230/230/250/250 (° C.), changing the mold temperature to 100 (° C.) and changing the in-mold crystallization time to 3 (min).

Comparative Example 7

Comparative Example 7 was carried out in the same manner as Example 3 with the exception of changing the cylinder temperatures of C1 (end)/C2/C3/C4/C5 (hopper side) to 225/225/225/235/235 (° C.), changing the mold temperature to 100 (° C.) and changing the in-mold crystallization time to 3 (min).

Comparative Example 8

Comparative Example 8 was carried out in the same manner as Example 3 with the exception of changing the cylinder temperatures of C1 (end)/C2/C3/C4/C5 (hopper side) to 225/225/225/235/235 (° C.), changing the mold temperature to 100 (° C.) and changing the in-mold crystallization time to 1 (min).

Comparative Example 9

Comparative Example 9 was carried out in the same manner as Example 3 with the exception of changing the cylinder temperatures of C1 (end)/C2/C3/C4/C5 (hopper side) to 225/225/225/235/235 (° C.), changing the mold temperature to 80 (° C.) and changing the in-mold crystallization time to 1 (min).

Comparative Example 10

Comparative Example 10 was carried out in the same manner as Example 3 with the exception of changing the cylinder temperatures of C1 (end)/C2/C3/C4/C5 (hopper side) to 225/225/225/235/235 (° C.), changing the mold temperature to 20 (° C.) and changing the in-mold crystallization time to 3 (min).

Comparative Example 11

Comparative Example 11 was carried out in the same manner as Example 3 with the exception of using PLLA-1 alone instead of crushing a non-stretched sheet comprised of PLLA-1 and PDLA-1 at a ratio of 50:50 (wt %), press forming into a sheet and cutting the sheet into chips, and with the exception of changing the cylinder temperatures of C1 (end)/C2/C3/C4/C5 (hopper side) to 200/200/200/200/200 (° C.), changing the mold temperature to 100 (° C.) and changing the in-mold crystallization time to 1 (min).

Comparative Example 12

Comparative Example 12 indicates an example of heating for 5 minutes at 120° C. with an oven in Comparative Example 11.

Comparative Example 13

Comparative Example 13 was carried out in the same manner as Example 3 with the exception preliminarily mixing PLLA-1 and talc (Nippon Talc Co., Ltd., P4) at a ratio of 70:30 (weight ratio) with a twin screw extruder and using the resulting pellets, changing the cylinder temperatures of C1 (end)/C2/C3/C4/C5 (hopper side) to 200/200/200/200/200 (°

C.), changing the mold temperature to 100 (° C.) and changing the in-mold crystallization time to 1 (min) instead of crushing a non-stretched sheet comprised of PLLA-1 and PDLA-1 at a ratio of 50:50 (weight ratio), press forming into a sheet and cutting the sheet into chips.

Comparative Example 14

Comparative Example 14 indicates an example of heating for 5 minutes at 120° C. with an oven in Comparative Example 22.

The results are shown in Tables 3-1 to 3-4.

TABLE 3-1

|  | Example 3 | Example 4 | Example 5 | Example 6 | Comp. Ex. 1 |
|---|---|---|---|---|---|
| PLLA | PLLA-1 | PLLA-1 | PLLA-1 | PLLA-1 | PLLA-1 |
| PDLA | PDLA-1 | PDLA-1 | PDLA-1 | PDLA-1 | PDLA-1 |
| PLLA molecular weight | 183,000 | 183,000 | 183,000 | 183,000 | 183,000 |
| PDLA molecular weight | 223,000 | 223,000 | 223,000 | 223,000 | 223,000 |
| Avg. molecular weight | 203,000 | 203,000 | 203,000 | 203,000 | 203,000 |
| Mixing ratio (PLLA/PDLA) | 50/50 | 50/50 | 50/50 | 50/50 | 50/50 |
| Talc content | 0 | 0 | 0 | 0 | 0 |
| Twin screw mixing to sheet formation conditions | Same as Example 1 | Same as Example 1 | Same as Example 1 | Same as Example 1 | Same as Example 1 |
| Injection molding conditions |  |  |  |  |  |
| (1) Cylinder temp. (° C.) |  |  |  |  |  |
| c1 | 215 | 215 | 215 | 215 | 215 |
| c2 | 215 | 215 | 215 | 215 | 215 |
| c3 | 215 | 215 | 215 | 215 | 215 |
| c4 | 215 | 215 | 215 | 215 | 215 |
| c5 | 235 | 235 | 235 | 235 | 235 |
| (2) Mold conditions |  |  |  |  |  |
| Temp. (° C.) | 130 | 120 | 120 | 110 | 60 |
| Time (min) | 1 | 1 | 3 | 3 | 1 |
| (3) Heat treatment | None | None | None | None | None |
| Mold opening | Good | Good | Good | Good | Good |
| Molding Evaluation Results |  |  |  |  |  |
| (1) Molding Evaluation (DSC) 1st heating |  |  |  |  |  |
| ΔHc (J/g) | 0 |  |  |  | 28.5 |
| Δhm SC (J/g) | 53.8 |  |  |  | 55.5 |
| Δh α (J/g) | 0 |  |  |  | 0 |
| (2) Transparency |  |  |  |  |  |
| HZ (%) | 60 |  |  |  |  |
| TT (%) | 84 |  |  |  |  |
| PT (%) | 30 |  |  |  |  |
| (3) Tensile strength |  |  |  |  |  |
| Fracture stress (MPa) | 37 |  |  |  |  |
| Fracture elongation (%) | 1 |  |  |  |  |

TABLE 3-2

|  | Comp. Ex. 2 | Comp. Ex. 3 | Comp. Ex. 4 | Comp. Ex. 5 | Comp. Ex. 6 |
|---|---|---|---|---|---|
| PLLA | PLLA-1 | PLLA-1 | PLLA-1 | PLLA-1 | PLLA-1 |
| PDLA | PDLA-1 | PDLA-1 | PDLA-1 | PDLA1 | PDLA-1 |
| PLLA molecular weight | 183,000 | 183,000 | 183,000 | 183,000 | 183,000 |
| PDLA molecular weight | 223,000 | 223,000 | 223,000 | 223,000 | 223,000 |
| Avg. molecular weight | 203,000 | 203,000 | 203,000 | 203,000 | 203,000 |
| Mixing ratio (PLLA/PDLA) | 50/50 | 50/50 | 50/50 | 50/50 | 50/50 |
| Talc content | 0 | 0 | 0 | 0 | 0 |
| Twin screw mixing to | Same as | Same as | Same as | Same as | Same as |

TABLE 3-2-continued

|  | Comp. Ex. 2 | Comp. Ex. 3 | Comp. Ex. 4 | Comp. Ex. 5 | Comp. Ex. 6 |
|---|---|---|---|---|---|
| sheet formation conditions | Example 1 | Example 1 | Example 1 | Example 1 | Example 1 |
| Injection molding conditions |  |  |  |  |  |
| (1) Cylinder temp. (° C.) |  |  |  |  |  |
| c1 | 250 | 250 | 250 | 250 | 230 |
| c2 | 250 | 250 | 250 | 250 | 230 |
| c3 | 250 | 250 | 250 | 250 | 230 |
| c4 | 250 | 250 | 250 | 250 | 250 |
| c5 | 250 | 250 | 250 | 250 | 250 |
| (2) Mold conditions |  |  |  |  |  |
| Temp. (° C.) | 80 | 80 | 90 | 100 | 100 |
| Time (min) | 1 | 3 | 3 | 3 | 3 |
| (3) Heat treatment | None | None | None | None | None |
| Mold opening | Poor | Poor | Poor | Poor | Poor |

TABLE 3-3

|  | Comp. Ex. 7 | Comp. Ex. 8 | Comp. Ex. 9 | Comp. Ex. 10 | Comp. Ex. 11 |
|---|---|---|---|---|---|
| PLLA | PLLA-1 | PLLA-1 | PLLA-1 | PLLA-1 | PLLA-1 |
| PDLA | PDLA-1 | PDLA-1 | PDLA-1 | PDLA-1 |  |
| PLLA molecular weight | 183,000 | 183,000 | 183,000 | 183,000 | 183,000 |
| PDLA molecular weight | 223,000 | 223,000 | 223,000 | 223,000 |  |
| Avg. molecular weight | 203,000 | 203,000 | 203,000 | 203,000 |  |
| Mixing ratio (PLLA/PDLA) | 50/50 | 50/50 | 50/50 | 50/50 | 100/0 |
| Talc content | 0 | 0 | 0 | 0 | 0 |
| Twin screw mixing to sheet formation conditions | Same as Example 1 | Same as Example 1 | Same as Example 1 | Same as Example 1 |  |
| Injection molding conditions |  |  |  |  |  |
| (1) Cylinder temp. (° C.) |  |  |  |  |  |
| c1 | 225 | 225 | 225 | 225 | 200 |
| c2 | 225 | 225 | 225 | 225 | 200 |
| c3 | 225 | 225 | 225 | 225 | 200 |
| c4 | 235 | 235 | 235 | 235 | 200 |
| c5 | 235 | 235 | 235 | 235 | 200 |
| (2) Mold conditions |  |  |  |  |  |
| Temp. (° C.) | 100 | 100 | 80 | 80 | 100 |
| Time (min) | 3 | 1 | 1 | 3 | 1 |
| (3) Heat treatment | None | None | None | None | None |
| Mold opening | Poor | Poor | Poor | Poor | Poor |
| Molding Evaluation Results |  |  |  |  |  |
| (1) Molding Evaluation (DSC) 1st heating |  |  |  |  |  |
| $\Delta Hc$ (J/g) |  |  |  |  | 30 |
| $\Delta hm\ SC$ (J/g) |  |  |  |  | 0 |
| $\Delta h\ \alpha$ (J/g) |  |  |  |  | 30 |
| (2) Transparency |  |  |  |  |  |
| HZ (%) |  |  |  |  | 13 |
| TT (%) |  |  |  |  | 86 |
| PT (%) |  |  |  |  | 12 |

TABLE 3-3-continued

|  | Comp. Ex. 7 | Comp. Ex. 8 | Comp. Ex. 9 | Comp. Ex. 10 | Comp. Ex. 11 |
|---|---|---|---|---|---|
| (3) Tensile strength |  |  |  |  |  |
| Fracture stress (MPa) |  |  |  |  | 82 |
| Fracture elongation (%) |  |  |  |  | 3 |

TABLE 3-4

|  | Comp. Ex. 12 | Comp. Ex. 13 | Comp. Ex. 14 |
|---|---|---|---|
| PLLA | PLLA-1 | PLLA-1 | PLLA-1 |
| PDLA |  |  |  |
| PLLA molecular weight | 183,000 | 183,000 | 183,000 |
| PDLA molecular weight |  |  |  |
| Avg. molecular weight |  |  |  |
| Mixing ratio (PLLA/PDLA) | 100/0 | 100/0 | 100/0 |
| Talc content | 0 | 30 | 30 |
| Twin screw mixing to sheet formation conditions | Same as Example 1 | Same as Example 1 | Same as Example 1 |
| Injection molding conditions |  |  |  |
| (1) Cylinder temp. (° C.) |  |  |  |
| c1 | 200 | 200 | 200 |
| c2 | 200 | 200 | 200 |
| c3 | 200 | 200 | 200 |
| c4 | 200 | 200 | 200 |
| c5 | 200 | 200 | 200 |
| (2) Mold conditions |  |  |  |
| Temp. (° C.) | 100 | 100 | 100 |
| Time (min) | 1 | 1 | 1 |
| (3) Heat treatment | 120° C. × 5 min |  | 120° C. × 5 min |
| Mold opening | Poor | Poor | Poor |
| Molding Evaluation Results |  |  |  |
| (1) Molding Evaluation (DSC) 1st heating |  |  |  |
| ΔHc (J/g) | 24 | 8 | 0 |
| Δhm SC (J/g) | 0 | 0 | 0 |
| Δh α (J/g) | 24 | 29 | 33 |
| (2) Transparency |  |  |  |
| HZ (%) | 81 | 99 | 100 |
| TT (%) | 88 | 12 | 11 |
| PT (%) | 17 | 0 | 0 |
| (3) Tensile strength |  |  |  |
| Fracture stress (MPa) | 75 | 54 | 57 |
| Fracture elongation (%) | 3 | 7 | 4 |

As is clear from the tables, Examples 3 to 6, in which a sheet in which PLLA-1 and PDLA-1 are adequately mixed in advance at a ratio of 50/50 (wt %) is used as a raw material and cylinder temperatures C1 to C4 are 220° C. or lower, had favorable mold opening since crystallization proceeded within the mold. In addition, as in Example 3, since the resulting moldings did not demonstrate a crystallization peak during the 1st heating in DSC measurement and were nearly completely crystallized, a melting peak did not appear when Tm is 150 to 180° C., but did appear when Tm is 200 to 250° C., the crystal structure within the moldings was in the form of a stereocomplex crystal structure. Transparency was also superior to Comparative Examples 13 and 14 in which calcium carbonate was incorporated in the PLLA-1 at 30% by weight.

In Comparative Example 14, heat treatment was carried for 5 minutes at 120° C. as compared to not being carried out in Comparative Example 13, and since ΔHc of the 1st heating decreased according to DSC measurement, crystallization is predicted to have proceeded resulting in improved heat resistance as a result of heat treatment.

Example 7

<Production of Sheet for Vacuum Molding>

A sheet having a thickness of about 300 μm produced in Example 1 was used for the raw material.

<Vacuum Molding>

Molding was carried out under the following conditions using the FKS-0631-20 Cut Sheet Testing and Molding Machine manufactured by Asano Laboratories Co., Ltd. A pudding mold having an upper surface diameter of 82 mm, lower surface diameter of 55 mm and drawing depth of 60 mm was used for the mold.

<1> Set Times
  Upper table lowering delay: 0.0 (sec)
  Vacuum delay: 0.8 (sec)
  Air pressure delay: 1.2 (sec)
  Lower table rising delay: 0.2 (sec)
  Cooling air delay: 0.0 (sec)
  Cooling time: 60.0 (sec)
  Mold clamping delay: 0.5 (sec)
  1st mold release time: 0.5 (sec)
  Evacuation time: 0.5 (sec)
  2nd mold release time: 0.0 (sec)
  Evacuation time: 0.5 (sec)
  Mold closing delay: 60.0 (sec)
  Compressed air pressure: 0.5 (sec)
<2> Upper Table
  Open height: 250.0 (mm)
  Lowering low speed position: 157.0 (mm)
  Shut height: 94.0 (mm)
  Lowering high speed: 100(%)
  Lowering low speed: 100(%)
  Rising high speed: 100(%)
  Rising low speed: 3(%)
  Rising high speed position: 150.0 (mm)
<3> Lower Table
  Shut height: 115.0 (mm)
  Rising low speed position: 220.0 (mm)
  Open height: 300.0 (mm)
  Rising high speed: 100(%)
  Rising low speed: 100(%)
  Lowering high speed: 20(%)

Rising low speed: 100(%)
Rising high speed position: 200.0 (mm)

The apparatus was a batch type system divided into a preheating unit (1) and a molding unit (2). First, the sheet was heated with a far infrared heater in the preheating unit (1), and when the temperature of the sheet surface was preheated to a set temperature as determined with a radiation thermometer, the sheet was transferred to the molding unit (2) where it was molded between the cavity and plug.

Molding was carried out when the preheating heater temperature reached 300° C. and the sheet surface temperature rose to 140° C. The preheating time was 21 seconds. In addition, the set temperature of the cavity was 100° C., the set temperature of the plug was 100° C., and the molding time (in-mold retention time) was 60 seconds.

Example 8

Example 8 was carried out in the same manner as Example 22 with the exception of changing the cavity set temperature to 140° C.

Example 9

Example 9 was carried out in the same manner as Example 22 with the exception of changing the preheating heater temperature to 400° C., carrying out molding when the sheet surface temperature rose to 80° C., changing the cavity set temperature to 130° C. and changing the plug set temperature to 130° C.

Comparative Example 15

Comparative Example 15 was carried out in the same manner as Example 22 with the exception of changing the preheating heater temperature to 400° C. and carrying out molding when the sheet surface temperature rose to 100° C.

Comparative Example 16

Comparative Example 16 was carried out in the same manner as Example 22 with the exception of changing the preheating heater temperature to 400° C., carrying out molding when the sheet surface temperature rose to 100° C., changing the cavity set temperature to 120° C. and changing the plug set temperature to 120° C.

Comparative Example 17

Comparative Example 17 was carried out in the same manner as Example 22 with the exception of using a sheet comprised of PLLA-1 alone instead of using a sheet comprised of PLLA-1 and PDLA-1 at a mixing ratio of 50:50 (wt %).

Comparative Example 18

Comparative Example 18 was carried out in the same manner as Example 22 with the exception of using a sheet comprised of PLLA-1 alone instead of using a sheet comprised of PLLA-1 and PDLA-1 at a mixing ratio of 50:50 (wt %), changing the cavity set temperature to 40° C. and changing the plug set temperature to 40° C.

The results are shown in Table 4.

TABLE 4

|  | Example 7 | Example 8 | Example 9 | Comp. Ex. 15 | Comp. Ex. 16 | Comp. Ex. 17 | Comp. Ex. 18 |
|---|---|---|---|---|---|---|---|
| PLLA | PLLA-1 | PLLA-1 | PLLA-1 | PLLA-1 | PLLA-1 | PLLA-1 | PLLA-1 |
| PDLA | PDLA-1 | PDLA-1 | PDLA-1 | PDLA-1 | PDLA-1 |  |  |
| PLLA molecular weight | 183,000 | 183,000 | 183,000 | 183,000 | 183,000 | 183,000 | 183,000 |
| PDLA molecular weight | 223,000 | 223,000 | 223,000 | 223,000 | 223,000 |  |  |
| Avg. molecular weight | 203,000 | 203,000 | 203,000 | 203,000 | 203,000 |  |  |
| Mixing ratio (PLLA/PDLA) | 50/50 | 50/50 | 50/50 | 50/50 | 50/50 | 100/0 | 100/0 |
| Twin screw mixing to sheet formation conditions | Same as Ex. 1 | Same as Ex. 1 | Same as Ex. 1 | Same as Ex. 1 | Same as Ex. 1 | Same as Ex. 1 | Same as Ex. 1 |
| Vacuum molding conditions |  |  |  |  |  |  |  |
| (1) Preheater temp. (° C.) | 300 | 300 | 400 | 400 | 400 | 300 | 300 |
| (2) Sheet surface temp. (° C.) | 140 | 140 | 80 | 100 | 100 | 140 | 140 |
| (3) Preheating time (sec) | 21 | 21 | 10 | 11 | 11 | 21 | 21 |
| (4) Cavity set temp. (° C.) | 100 | 140 | 130 | 100 | 120 | 100 | 40 |
| (5) Plug set temp. (° C.) | 100 | 100 | 130 | 100 | 120 | 100 | 40 |
| (6) Molding time (sec) | 60 | 10 | 60 | 60 | 60 | 60 | 60 |
| Evaluation Results |  |  |  |  |  |  |  |
| (1) Moldability | ○ | ○ | Δ | ○ | X | X | ○ |
| (2) Heat resistance | ○ | ○ | Δ | X | Immeasurable | Immeasurable | X |
| (3) Haze value | 23 | 23 | 10 | 10 | Immeasurable | Immeasurable | 11 |

As is clear from Table 4, Examples 7 and 8, in which a sheet in which PLLA-1 and PDLA-1 were adequately mixed in advance at a ratio of 50:50 (wt %) was used for the raw material and the sheet was partially crystallized during the course of preheating, the haze value increased somewhat and both moldability and heat resistance were superior.

On the other hand, in the case of Comparative Example 16 comprised of PLLA-1 alone, the molding softened when molded under the same conditions, ended up sticking to the mold and was unable to be molded, while in Comparative Example 17, in which the cavity and plug temperatures were lowered to room temperature for molding, prevented the obtaining of heat resistance.

In addition, in the case of Example 9, in which the preheating heater temperature was lowered and preheating time was shortened, a sample was obtained having a low haze value despite moldability being unstable. There was no large deformation even when hot water was placed inside and the resulting sample had superior heat resistance.

Example 10

<Production of Sheet for Vacuum Molding>

A sheet (non-stretched) having a thickness of about 300 μm produced in Example 1 was used for the raw material.

<Vacuum Molding>

Molding was carried out under the following conditions using a vacuum molding machine manufactured by Omori Co., Ltd. A cylindrical mold having an inner diameter of 100 mm and a drawing depth of 40 mm was used for the mold.
  Preheating time: 5.0 (sec)
  Preheating temperature: 100 (° C.)
  The cavity was not heated (temperature: about 15° C.)
<Heat Treatment>

The above molding was fastened to an aluminum jig and subjected to heat treatment for 15 minutes at 200° C. in an oven. In addition, the molding and the jig were immersed in water at 20° C. to rapidly cool the molding following heat treatment. The resulting molding was not deformed even when filled with hot water at 98° C. In addition, the molding demonstrated superior transparency having a haze value of 3.9(%), TT of 91.4(%) and PT of 87.9(%).

In the following examples and comparative examples, PLLA-1 and PDLA-1 were as previously described, and the glass fiber was as described below.
(a) NSG Vetrotex Glass Fiber RES 03 (fibrous) (GF1)
  Fiber diameter: 10 μm
  Fiber length: 3 mm
(b) Nippon Sheet Glass Co., Ltd. Glass Flakes REF-500A (flaked) (GF2)
  Flake thickness: Avg. 5 μm, flake diameter: 10 to 4000 μm (average: 4 mm)
(c) Nitto Boseki Co., Ltd. Glass Fiber CSF3PE-941 (fibrous) (GF3)
  Fiber diameter: 5 to 10 μm
  Fiber length: 3 mm Furthermore, measurement methods were as described below with the exception of those previously described.
(6) Tensile Test
  Test pieces (length: 120 mm, width: 15 mm) were measured after sampling from a pressed sheet.
    Apparatus: Universal Material Tester Model 2010-5 (Intesco Co., Ltd.)
    Test piece form: 120 mm×15 mm×1 mm thick
    Clamp distance: 60 mm
    Testing speed: 50 mm/min
    Test environment: 23° C., 50%
    No. of tests: n=3
(7) Bending Stiffness
  Test pieces (length: 60 mm, width: 15 mm) were measured after sampling from a pressed sheet.
    Apparatus: Olsen Type Stiffness Tester Model 6-U (Toyo Seiki Seisakusho, Ltd.)
    Test piece form: 60 mm×15 mm×1 mm thick
    Testing method: In compliance with JIS K 7106
    Interfulcrum distance: 15 mm
    Test environment: 23° C., 50%
    No. of tests: n=5
(8) Heat Resistance
  Test pieces (length: 120 mm, width: 15 mm) were sampled from a pressed sheet and measured after superimposing three test pieces and taping the ends thereof with cellophane tape.
  However, a test piece (ASTM ¼ inch) was used as is for injection moldings.
    Apparatus: Fully Automated HDT Tester Model 148-HDA6 (Yasuda Seiki Seisakusho, Ltd.)
    Test piece form: 120 mm×15 mm×3 mm thick (three 1 mm thick test pieces superimposed on each other)
    Testing method: In compliance with JIS K 7191
    Direction of test piece: Edge-wise
    Testing load: Low load (0.45 MPa)
      High load (1.81 MPa)
    No. of tests: n=2
(9) Tensile Test
  An injection molding test piece (dumbbell-shaped) was used for testing.
    Type of tester: Universal Material Tester Model 2100 (Intesco Co., Ltd.)
    Test piece form: JIS K7113-2
    Clamp distance: 80 mm
    Testing speed: 50 mm/min
    Test environment: 23° C., 50%
    No. of tests: n=3
(10) Izod Impact Test
  An injection molding test piece (notched) was used for testing.
    Testing method: Izod JIS
    Hammer capacity: 3.92 J (40 kgf·cm)
    Clamp distance: 80 mm
    Presence of notch: Notched
    Contact accuracy: 149.0°
    Testing temperature: 23° C.
    No. of tests: n=3
(11) Bending Modulus of Elasticity
    Type of tester: Universal Material Tester Model 2001-5 (Intesco Co., Ltd.)
    Test piece form: ASTM ¼ inch
    Testing speed: 2 mm inch/min
    Interfulcrum distance: 100 mm
    Test environment: 23° C., 50%
    No. of tests: n=3

Example 11

<Production of Polylactic Acid Composition>

When 81 g of PLLA-1 and PDLA-1 were weighed at a weight ratio of 50:50 followed by melting and mixing for 15 minutes under conditions of 250° C. and 120 rpm using the Laboplastomill Model C (twin screw mixer) manufactured by Toyo Seiki Co., 9 g of GF1 (equivalent to 10% by weight of the entire mixture) and further mixing under the same conditions for 5 minutes (total time: 20 minutes) to obtain a polylactic acid composition (Composition 11).

<Production of Pressed Sheet>

After sandwiching Composition 11 between 50 μm polyimide film (Ube Industries, trade name: Upilex 50S), the sandwiched composition was placed in a stainless steel rectangular flask having a thickness of 1.0 mm and measuring 240 mm×240 mm followed by press molding under conditions of a press temperature of 240° C., time of 8 minutes (pressure: 0.6 kgf), 10 cycles of gas venting, pressing time of 4 minutes (pressure: 30 kgf) and cooling time of 5 minutes (pressure: 30 kgf) to obtain a pressed sheet (Pressed Sheet 11).

<Test Piece Production>

40 strips measuring 15 mm×120 mm×1 mm thick were cut out of the pressed sheet 11.

Moreover, these strips were subjected to heat treatment. Namely, 10 strips at a time were subjected to heat treatment consisting of: (1) 10 minutes in an oven at 130° C., (2) 30 minutes in an oven at 200° C., (3) 3 minutes in a press at 200° C., and (4) 7 minutes in a press at 200° C.

Example 12

Example 12 was carried out in the same manner as Example 11 with the exception of weighing out 72 g of the PLLA-1 and PDLA-1 of Example 11 at a weight ratio of 50:50 and changing the amount of GF1 to 18 g (equivalent to 20% by weight of the entire mixture).

Example 13

Example 13 was carried out in the same manner as Example 11 with the exception of weighing out 63 g of the PLLA-1 and PDLA-1 of Example 11 at a weight ratio of 50:50 and changing the amount of GF1 to 27 g (equivalent to 30% by weight of the entire mixture).

Example 14

Example 14 was carried out in the same manner as Example 11 with the exception of weighing out 54 g of the PLLA-1 and PDLA-1 of Example 11 at a weight ratio of 50:50 and changing the amount of GF1 to 36 g (equivalent to 40% by weight of the entire mixture).

Example 15

Example 15 was carried out in the same manner as Example 11 with the exception of weighing out 45 g of the PLLA-1 and PDLA-1 of Example 1 at a weight ratio of 50:50 and changing the amount of GF1 to 45 g (equivalent to 50% by weight of the entire mixture).

Example 16

Example 16 was carried out in the same manner as Example 13 with the exception of using GF2 instead of GF1.

Example 17

Example 17 was carried out in the same manner as Example 13 with the exception of using GF3 instead of GF1.

Comparative Example 19

Comparative Example 19 was carried out in the same manner as Example 1 with the exception of weighing out 90 g of the PLLA-1 and PDLA-1 of Example 11 at a weight ratio of 50:50 and not adding GF1.

Comparative Examples 20 and 21

When 63 g of PLLA-1 were weighed at a ratio of 100:1 (wt %) followed by melting and mixing for 3 minutes under conditions of 200° C. and 120 rpm using the Laboplastomill Model C (twin screw mixer) manufactured by Toyo Seiki Co., 27 g of GF1 (equivalent to 30% by weight of the entire mixture) and further mixing under the same conditions for 3 minutes (total time: 6 minutes) to obtain a polylactic acid composition (Composition C-21).

<Production of Pressed Sheet>

After sandwiching Composition C-21 between 50 μm polyimide film (Ube Industries, trade name: Upilex 50S), the sandwiched composition was placed in a stainless steel rectangular flask having a thickness of 1.0 mm and measuring 240 mm×240 mm followed by press molding under conditions of a press temperature of 200° C., time of 8 minutes (pressure: 0.6 kgf), 10 cycles of gas venting, pressing time of 4 minutes (pressure: 30 kgf) and cooling time of 5 minutes (pressure: 30 kgf) to obtain a pressed sheet (Pressed Sheet C-21). In addition, a pressed sheet comprised of PLLA-1 alone was similarly obtained (Pressed Sheet C-20).

<Test Piece Production>

40 strips measuring 15 mm×120 mm×1 mm thick were cut out of the pressed sheet of C-20 and the press sheet of C-21.

Moreover, these strips were subjected to heat treatment. Namely, 10 strips at a time were subjected to heat treatment consisting of: (1) 10 minutes in an oven at 130° C., (2) 30 minutes in an oven at 200° C., (3) 3 minutes in a press at 200° C., and (4) 7 minutes in a press at 200° C.

Comparative Example 22

Comparative Example 22 was carried out in the same manner as Comparative Example 20 with the exception of using GF2 instead of GF1.

Comparative Example 23

Comparative Example 23 was carried out in the same manner as Comparative Example 20 with the exception of using GF3 instead of GF1.

These results are shown in Tables 5-1 and 5-2.

TABLE 5-1

| Item | Unit | Ex. 11 | Ex. 12 | Ex. 13 | Ex. 14 | Ex. 15 | Ex. 16 | Ex. 17 |
|---|---|---|---|---|---|---|---|---|
| PLLA-1 | (wt %) | 50 | 50 | 50 | 50 | 50 | 50 | 50 |
| PLLA-2 | (wt %) | 50 | 50 | 50 | 50 | 50 | 50 | 50 |
| Glass fiber type | | GF1 | GF1 | GF1 | GF1 | GF1 | GF2 | GF3 |
| Filled amount | (wt %) | 10 | 20 | 30 | 40 | 50 | 30 | 30 |

| Item | Unit | Comp. Ex. 19 | Comp. Ex. 20 | Comp. Ex. 21 | Comp. Ex. 22 | Comp. Ex. 23 |
|---|---|---|---|---|---|---|
| PLLA-1 | (wt %) | 50 | 100 | 100 | 100 | 100 |
| PLLA-2 | (wt %) | 50 | | | | |
| Glass fiber type | | None | None | GF1 | GF2 | GF3 |
| Filled amount | (wt %) | 0 | 0 | 30 | 30 | 30 |

TABLE 5-2

| Heat treatment conditions | | Item/Unit | Ex. 11 | Ex. 12 | Ex. 13 | Ex. 14 | Ex. 15 | Ex. 16 | Ex. 17 |
|---|---|---|---|---|---|---|---|---|---|
| Oven | 130° C. × 10 min | Heat deflection temp. Low load (° C.) | 157.7 | 153.5 | 136.5 | 134.9 | 133.4 | 84.7 | 81.6 |
| | 200° C. × 30 min | Heat deflection temp. Low load (° C.) | 94.9 | 197.5 | 192.4 | 197.3 | 197.8 | 159.8 | 150.4 |
| Press | 200° C. × 3 min | Heat deflection temp. Low load (° C.) | 76.9 | 88.9 | 195.6 | 187.1 | 195.4 | 197.3 | 194.1 |
| | 200° C. × 7 min | Transparency (%) | | | | | | | |
| | | HZ (%) | 46 | 97 | 99 | 99 | 99 | 94 | 99 |
| | | PT (%) | 41 | 2 | 1 | 0 | 0 | 5 | 1 |
| | | Olsen bending stiffness (MPa) | 1710 | 2750 | 3060 | 3570 | 4800 | 4120 | 4270 |
| | | Heat deflection temp. | | | | | | | |
| | | Low load (° C.) | 208.3 | 200.4 | 203.9 | 204.4 | 203.8 | 203.1 | 207.3 |
| | | High load (° C.) | | | | | 178.9 | | 193.1 |

| Heat treatment conditions | | Item/Unit | Comp. Ex. 19 | Comp. Ex. 20 | Comp. Ex. 21 | Comp. Ex. 22 | Comp. Ex. 23 |
|---|---|---|---|---|---|---|---|
| Oven | 130° C. × 10 min | Heat deflection temp. Low load (° C.) | 77.9 | 88.1 | 135.5 | 146.8 | 160.3 |
| | 200° C. × 30 min | Heat deflection temp. Low load (° C.) | 63.7 | Melted/immeasurable | Melted/immeasurable | Melted/immeasurable | Melted/immeasurable |
| Press | 200° C. × 3 min | Heat deflection temp. Low load (° C.) | 57.1 | Melted/immeasurable | Melted/immeasurable | Melted/immeasurable | Melted/immeasurable |
| | 200° C. × 7 min | Transparency (%) | | Melted/immeasurable | Melted/immeasurable | Melted/immeasurable | Melted/immeasurable |
| | | HZ (%) | 8 | | | | |
| | | PT (%) | 82 | | | | |
| | | Olsen bending stiffness (MPa) | 1680 | | | | |
| | | Heat deflection temp. | | | | | |
| | | Low load (° C.) | 66.5 | | | | |
| | | High load (° C.) | | | | | |

Figure 9:
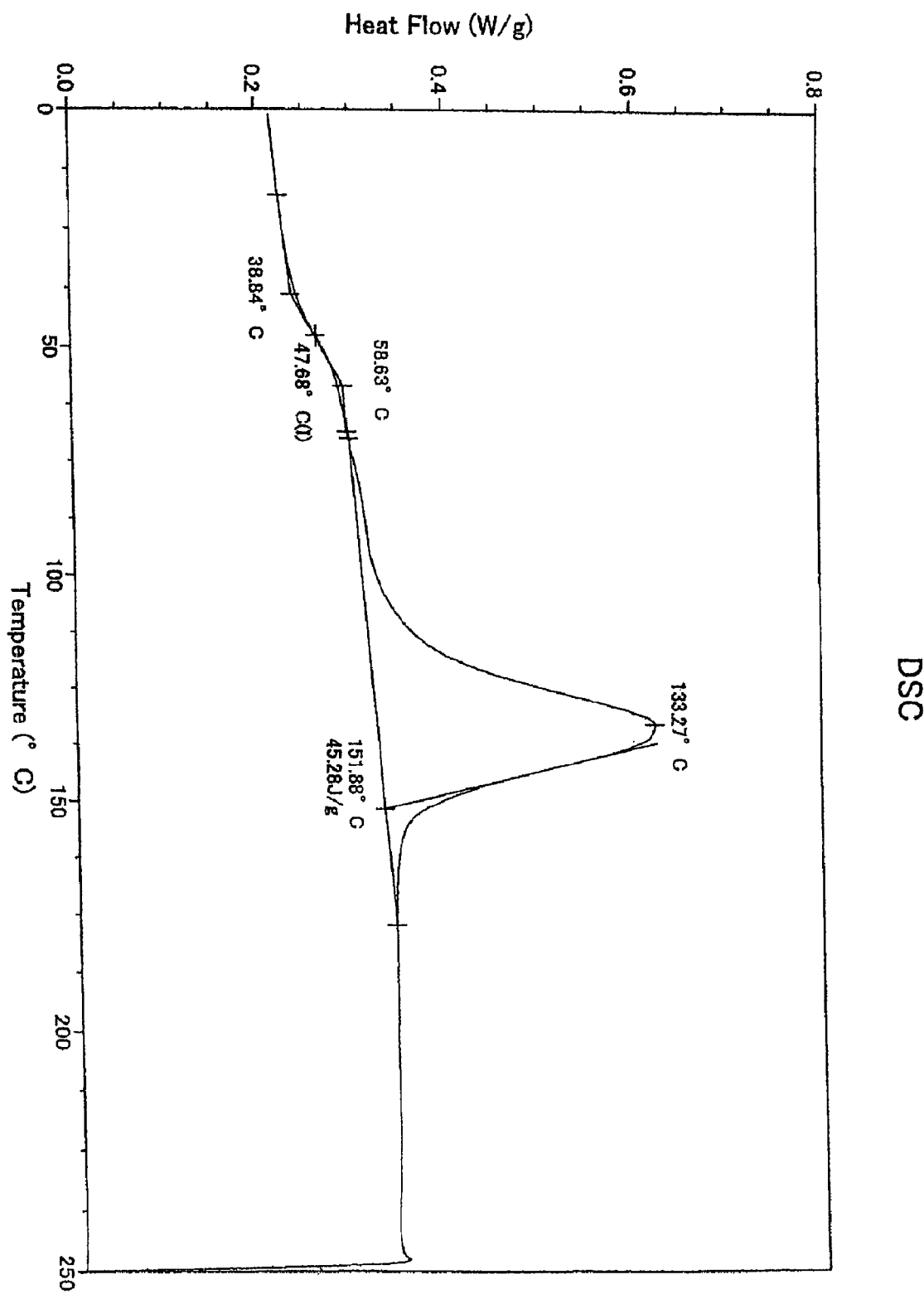
FIG. 9 is a drawing showing a chart of DSC measurement during 1st cooling of a polylactic acid polymer component (not containing GF) used in a polylactic acid composition of Example 11 (Composition 11), or in other words, a chart is shown of the results of DSC measurement during 1st cooling of a polylactic acid polymer component (not containing GF) obtained by weighing 90 g of PLLA-1 and PDLA-1 at a weight ratio of 50:50 and melting and mixing for 15 minutes under conditions of 250° C. and 120 rpm using the Laboplastomill Model C (twin screw mixer) manufactured by Toyo Seiki Co.
Figure 10:
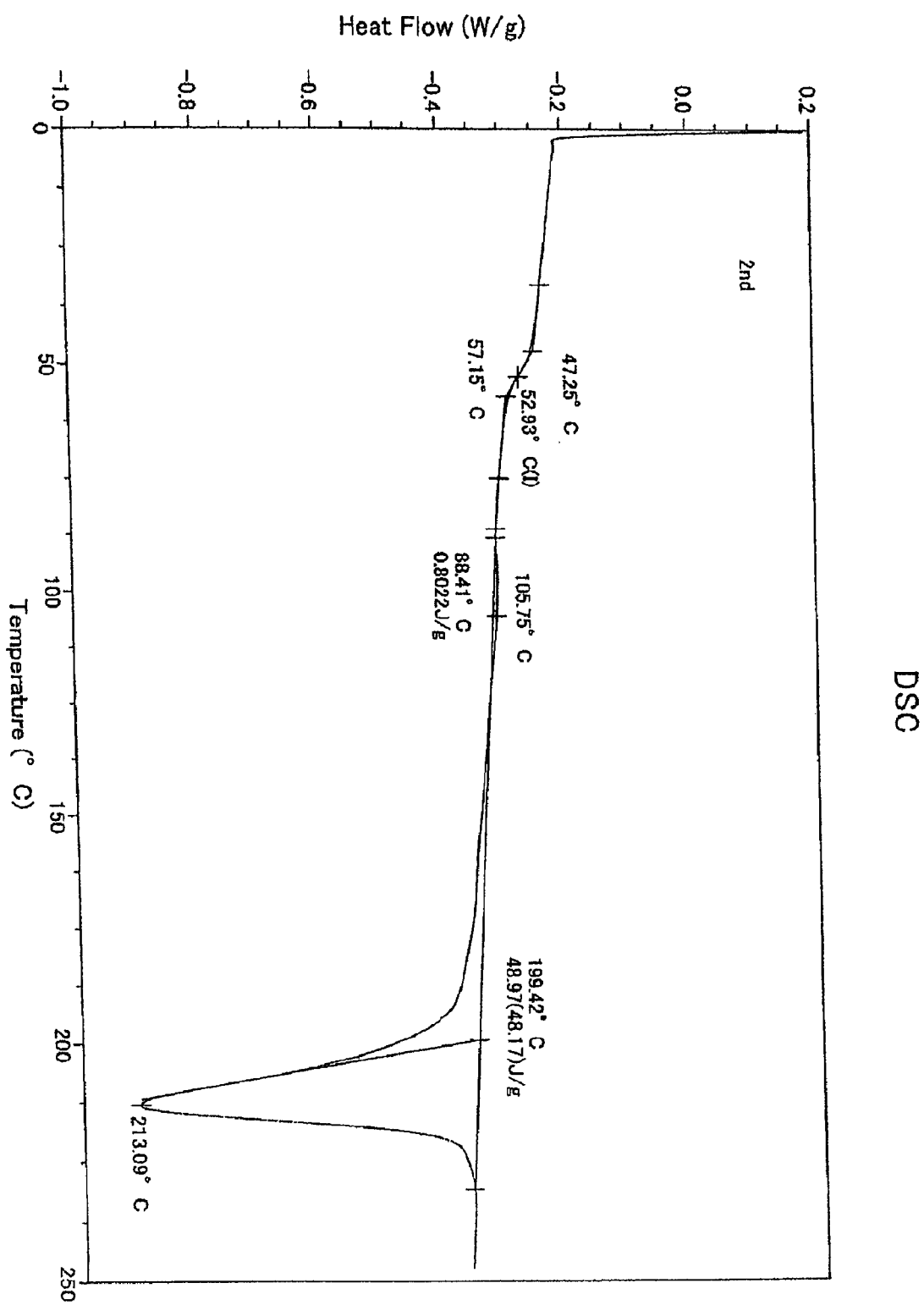
FIG. 10 is a drawing showing a chart indicating the results of DSC measurement during 2nd heating of a polylactic acid polymer component (not containing GF) used in a polylactic acid composition of Example 11 (Composition 11).

FIGS. 9 and 10 show DSC charts of the polylactic acid polymer component used in the polylactic acid composition of Example 11 (Composition 11). Namely, FIG. 9 is the DSC measurement chart of a 1st cooling of the polylactic acid polymer component (not containing GF) (which is also the polylactic acid composition of Comparative Example 19) obtained by weighing out 81 g of PLLA-1 and PDLA-1 at a weight ratio of 50:50 followed by melting and mixing for 15 minutes under conditions of 250° C. and 120 rpm using the Laboplastomill Model C (twin screw mixer) manufactured by Toyo Seiki Co. In addition, FIG. 10 is the DSC measurement chart of the 2nd heating.

As is clear from these charts, in the case of the mixtures of poly-L-lactic acid and poly-D-lactic acid of Examples 11 to 17, the peak during cooling (at a rate of 10° C./min) after allowing to remain at 250° C. for 10 minutes in DSC measurement was 30 mJ/mg or more, and the ratio of the peak (peak 1) for Tm=150 to 180° C. in measurement during the DSC 2nd heating (consisting of cooling at a rate of 10° C./min after allowing to remain at 250° C. for 10 minutes followed by reheating from 0° C. at a rate of 10° C./min) to the peak (peak 2) for Tm=200 to 240° C. (peak 1/peak 2) was 0.5 or less.

In each of Examples 11 to 17, in which glass fiber was mixed into the polylactic acid compositions, the heat deflection temperature was considerably higher than Comparative Example 19 not mixed with glass fiber when the HDT (low load) was 200° C. On the other hand, in the case of Comparative Examples 20 to 22, which only contained poly-L-lactic acid for the polylactic acid, the heat resistance temperature was inadequate at about 160° C. even when subjected to heat treatment consisting of (1) 10 minutes in an oven at 130° C., and the moldings melted and were immeasurable despite being subjected to further heat treatment consisting of: (2) 30 minutes in an oven at 200° C., (3) 3 minutes in a press at 200° C., and (4) 7 minutes in a press at 200° C.

Example 28

<Production of Polylactic Acid Composition>

When 70 g of PLLA-1 and PDLA-1 were weighed at a weight ratio of 50:50 followed by melting and mixing for 15 minutes under conditions of 250° C. and 120 rpm using the Laboplastomill Model C (twin screw mixer) manufactured by Toyo Seiki Co., 30 g of GF1 (equivalent to 30% by weight of the entire mixture) and further mixing under the same conditions for 5 minutes (total time: 20 minutes) to obtain a polylactic acid composition (Composition 28). This procedure was repeated six times to obtain a total of 600 g of the composition.

<Production of Pressed Sheet>

After sandwiching Composition 28 between 50 μm polyimide film (Ube Industries, trade name: Upilex 50S), the sandwiched composition was placed in a stainless steel rectangular flask having a thickness of 1.0 mm and measuring 230 mm×260 mm followed by press molding under conditions of a press temperature of 240° C., time of 8 minutes (pressure: 0.6 kgf), 10 cycles of gas venting, pressing time of 4 minutes (pressure: 30 kgf) and cooling time of 5 minutes (pressure: 30 kgf) to obtain seven pressed sheets (Pressed Sheet 28).

<Chip Production>

Pressed sheets 28 were formed into chips measuring 5 mm in width×about 20 mm by passing through a plastic shredder. The chips were further passed through a crusher to shorten the length of those chips having a length of 30 mm or more.

<Production of Test Pieces by Injection Molding>

Injection molding was carried out using the above chips.

Molding was carried out under the following conditions using the Toyo Machinery & Metal Co., Ltd. Model Ti-100III Injection Molding Machine.

A specimen mold having a thickness of 3 mm was used for the mold.

Screw diameter: 24 mm

Cylinder temperature: C1 (end)/C2/C3/C4 (hopper side) =210/220/220/215 (° C.)

Mold temperature: 180 (° C.)

In-mold crystallization time: 1 (min)

Injection:

Rate at switching positions from 0 to 17 mm: 3.0 (mm/s), pressure: 0 (MPa), timer: 0 (sec)

Rate at switching positions from 17 to 36 mm: 4.1 (mm/s), pressure: 50 (MPa), timer: 2 (sec)

Rate at switching positions from 36 to 45 mm: 4.1 (mm/s), pressure: 100 (MPa), timer: 20 (sec)

Metering rate: 10.0 (mm/s)

Suckback (0.0 mm width position): 91.1 (mm/s)

The results are shown in Table 6.

TABLE 6

| Item | Unit | Example 28 | Example 29 | Example 30 |
|---|---|---|---|---|
| PLLA-1 | (wt %) | 50 | 50 | 50 |
| PLLA-2 | (wt %) | 50 | 50 | 50 |
| Glass fiber type | | GF1 | GF2 | GF3 |
| Filled amount | (wt %) | 30 | 30 | 30 |
| Tensile Test | | | | |
| Fracture strength | (MPa) | 74.5 | 35.4 | 100.8 |
| Fracture elongation | (%) | 1.1 | 0.5 | 1.4 |
| Bending elastic modulus | (MPa) | 7800 | 7840 | 8730 |
| Izod impact strength | (J/m) | 84 | 19 | 74 |
| Heat deflection temp. | (° C.) | 209.7 | 191.7 | 212.3 |

As is clear from Table 6, Examples 28, 29 and 30, in which the same compositions as Examples 13, 16 and 17 were injection molded, were determined to yield moldings having superior tensile strength, heat resistance and Izod impact strength in a cycle of one minute. In particular, Examples 28 and 30, which were filled with long glass fiber, demonstrated superior tensile strength, bending modulus of elasticity and Iso impact strength comparable to so-called engineering plastics such as glass-reinforced PBT.

INDUSTRIAL APPLICABILITY

A composition of the present invention has specific thermal characteristics. This is thought to be because a stereo complex structure is easily formed both selectively and uniformly. Consequently, various types of moldings such as stretched films comprised of the present composition have superior heat resistance, gas barrier properties and toughness as compared with moldings comprised of poly-L-lactic acid or poly-D-lactic acid alone, while also having superior surface smoothness and transparency. In addition, moldings obtained by injection molding and the like have superior process ability (mold opening) and transparency as compared with conventional moldings.

Thus, moldings such as film, sheets or threads obtained by various molding methods such as injection molding, blow molding, extrusion molding or spinning comprised of the composition of the present invention all have superior heat resistance. This is due to the selective formation of a stereo complex structure during crystallization from an amorphous state, and crystallization treatment according to the composition of the present invention is easy.

In addition, a composition incorporating an inorganic filler of the present invention has improved biodegradability and heat resistance, and can be used in various moldings.

The invention claimed is:

1. A molding, molded by injection-, blow-, or vacuum-/air-pressure molding, or by extrusion, comprising a polylactic acid composition obtained by melt-kneading 75 to 25 weight parts of poly-L-lactic acid and 25 to 75 weight parts of poly-D-lactic acid (the total of poly-L-lactic acid and poly-D-lactic acid being 100 weight parts) so as to obtain a value ranging from 0.3 to 0.6 of the numerical value of the weight-average molecular weight obtained by calculating the weighted mean of the weight-average molecular weights of each of the poly-L-lactic acid and poly-D-lactic acid; and a peak in DSC measurement during cooling (at a rate of 10° C./min) after allowing to remain at 250° C. for 10 minutes is 30 mJ/mg or more.

2. The molding according to claim 1, wherein the polylactic acid composition has a weight average molecular weight of 10,000 to 300,000.

3. The injection molding according to claim 1, wherein the transparency of the injection molding is such that the total transmittance (TT) at a thickness of 3 mm is 60% or more.

4. The vacuum/air pressure molding according to claim 1, having heat resistance.

5. The molding according to claim 1, having a layer comprising a polymer of an unsaturated carboxylic acid or derivative thereof.

6. The molding according to claim 1, having an inorganic layer.

7. A molding, comprising a polylactic acid composition containing a polylactic acid composition (A) and an inorganic filler (B), the polylactic acid composition (A) being prepared from 75 to 25 parts by weight of poly-L-lactic acid and 25 to 75 parts by weight of poly-D-lactic acid (based on 100 parts by weight of the total of poly-L-lactic acid and poly-D-lactic acid), and by melting and mixing so that the weight average molecular weight of the resulting composition is within the range of 0.3 to 0.6 times the value of the weight average molecular weight obtained by weight-averaging the respective weight-average molecular weights of the poly-L-lactic acid and poly-D-lactic acid that are used, the peak in DSC measurement during cooling (at a rate of 10° C./min) after allowing to remain at 250° C. for 10 minutes is 30 mJ/mg or more.

8. A molding comprising the molding comprising a polylactic acid composition according to claim 7, wherein the weight average molecular weight of the polylactic acid composition (A) is 10,000 to 300,000.

9. A molding comprising the molding comprising a polylactic acid composition according to claim 7, wherein the inorganic filler (B) is glass fiber.

10. The molding comprising a polylactic acid composition according to claim 7, wherein the molding is obtained from the polylactic acid composition by injection molding or press molding.

11. The molding obtained from a polylactic acid composition according to claim 7, wherein the load deflection temperature during a load of 0.45 MPa is 150° C. or higher.

12. The molding according to claim 7, wherein the molding is a sheet.

13. The molding according to claim 7, wherein the molding is heat-treated after molding.

14. The molding according to claim 13, wherein the heat treatment temperature is 160 to 220° C. and the heat treatment time is 10 seconds to 1 hour.

15. A molding comprising a polylactic acid composition containing: a polylactic acid composition (A) which contains poly-L-lactic acid and poly-D-lactic acid and in which the peak in DSC measurement during cooling (at a rate of 10° C./min) after allowing to remain at 250° C. for 10 minutes is 30 mJ/mg or more and an inorganic filler, wherein the polylactic acid composition (A) is such that, in a DSC measurement made during the DSC 2nd heating (cooling at a rate of 10° C./min after allowing to remain at 250° C. for 10 minutes followed by reheating from 0° C. at a rate of 10° C./min), the peak ratio (peak 1/peak 2) of the peak when Tm is 150 to 180° C. (peak 1) to the peak when Tm is 200 to 240° C. (peak 2) is 0.5 or less.

16. The molding comprising a polylactic acid composition according to claim 15, wherein the polylactic acid composition (A) is such that, in measurement during the DSC 2nd heating (cooling at a rate of 10° C./min after allowing to remain at 250° C. for 10 minutes followed by reheating from 0° C. at a rate of 10° C./min), the peak when Tm is 200 to 240° C. (peak 2) is 35 mJ/mg or more.

* * * * *